Figure 1:
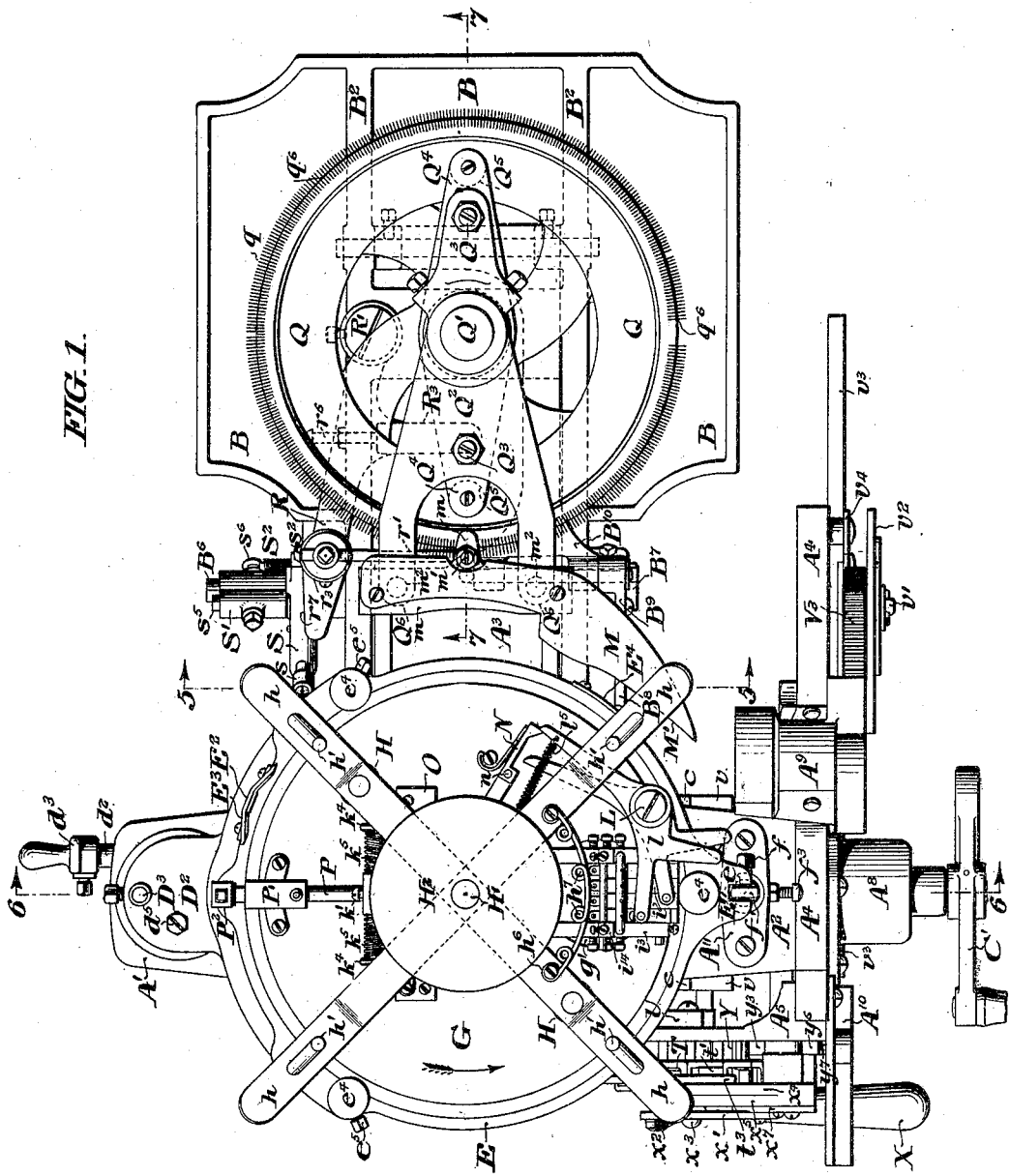

No. 794,407. PATENTED JULY 11, 1905.
E. A. HIRNER.
THREAD CHANGING MECHANISM FOR CIRCULAR KNITTING MACHINES.
APPLICATION FILED DEC. 20, 1900.

13 SHEETS—SHEET 1.

WITNESSES: INVENTOR:
Emil A. Hirner
by his Attorneys

No. 794,407. PATENTED JULY 11, 1905.
E. A. HIRNER.
THREAD CHANGING MECHANISM FOR CIRCULAR KNITTING MACHINES.
APPLICATION FILED DEC. 20, 1900.

13 SHEETS—SHEET 2.

WITNESSES:
Arthur E. Paige
James H. Bill

INVENTOR:
Emil A. Hirner
by his attorneys
Freery + Paul

No. 794,407. PATENTED JULY 11, 1905.
E. A. HIRNER.
THREAD CHANGING MECHANISM FOR CIRCULAR KNITTING MACHINES.
APPLICATION FILED DEC. 20, 1900.

13 SHEETS—SHEET 4.

WITNESSES: INVENTOR:

No. 794,407. PATENTED JULY 11, 1905.
E. A. HIRNER.
THREAD CHANGING MECHANISM FOR CIRCULAR KNITTING MACHINES.
APPLICATION FILED DEC. 20, 1900.

13 SHEETS—SHEET 5.

WITNESSES:
Arthur E. Paige.
James H. Bell

INVENTOR:
Emil A. Hirner
by his attorneys
Finley & Paul

No. 794,407. PATENTED JULY 11, 1905.
E. A. HIRNER.
THREAD CHANGING MECHANISM FOR CIRCULAR KNITTING MACHINES.
APPLICATION FILED DEC. 20, 1900.
13 SHEETS—SHEET 7.
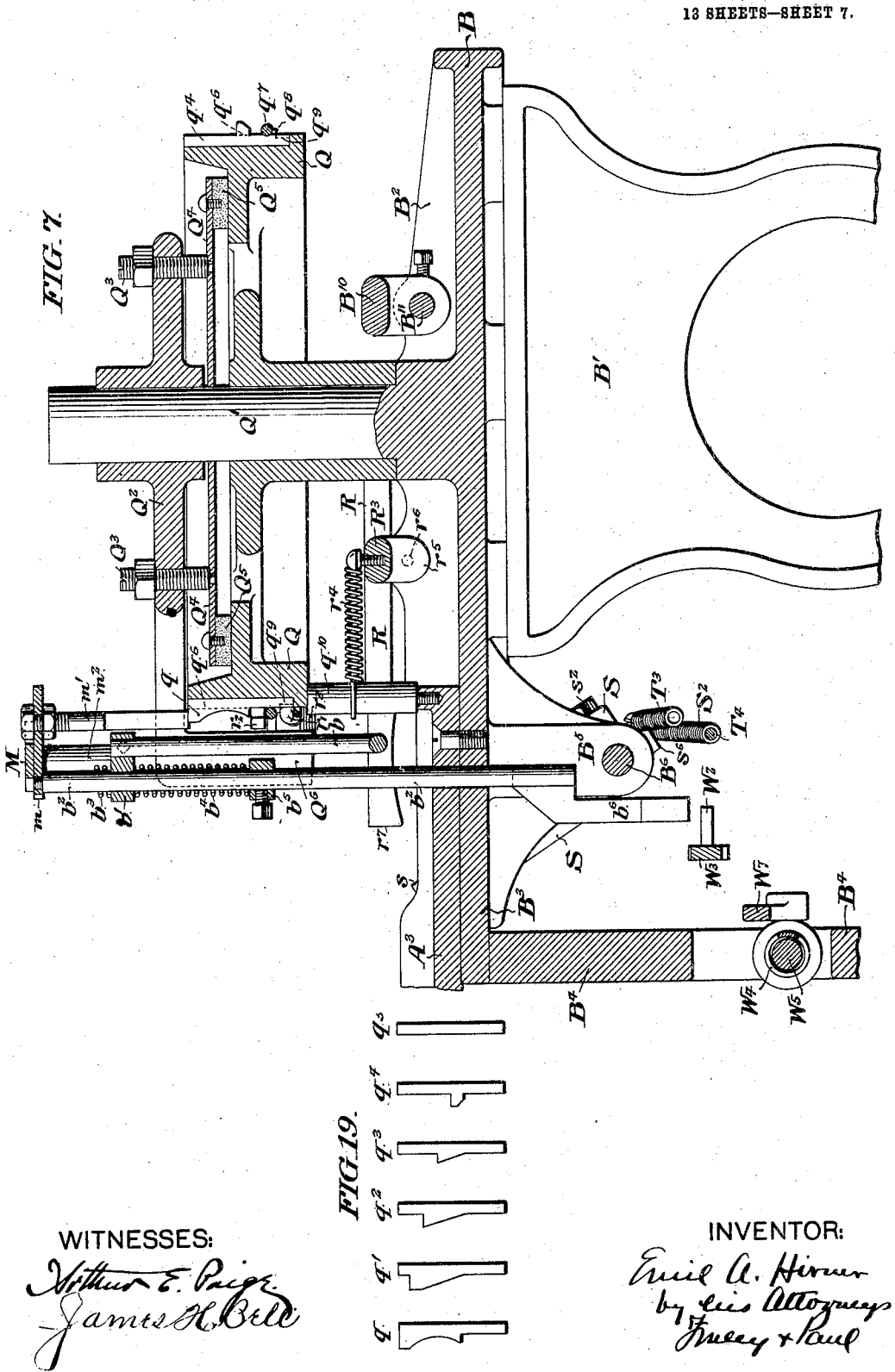
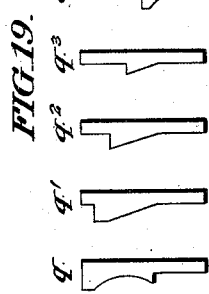
WITNESSES:
INVENTOR:

No. 794,407. PATENTED JULY 11, 1905.
E. A. HIRNER.
THREAD CHANGING MECHANISM FOR CIRCULAR KNITTING MACHINES.
APPLICATION FILED DEC. 20, 1900.
13 SHEETS—SHEET 8.
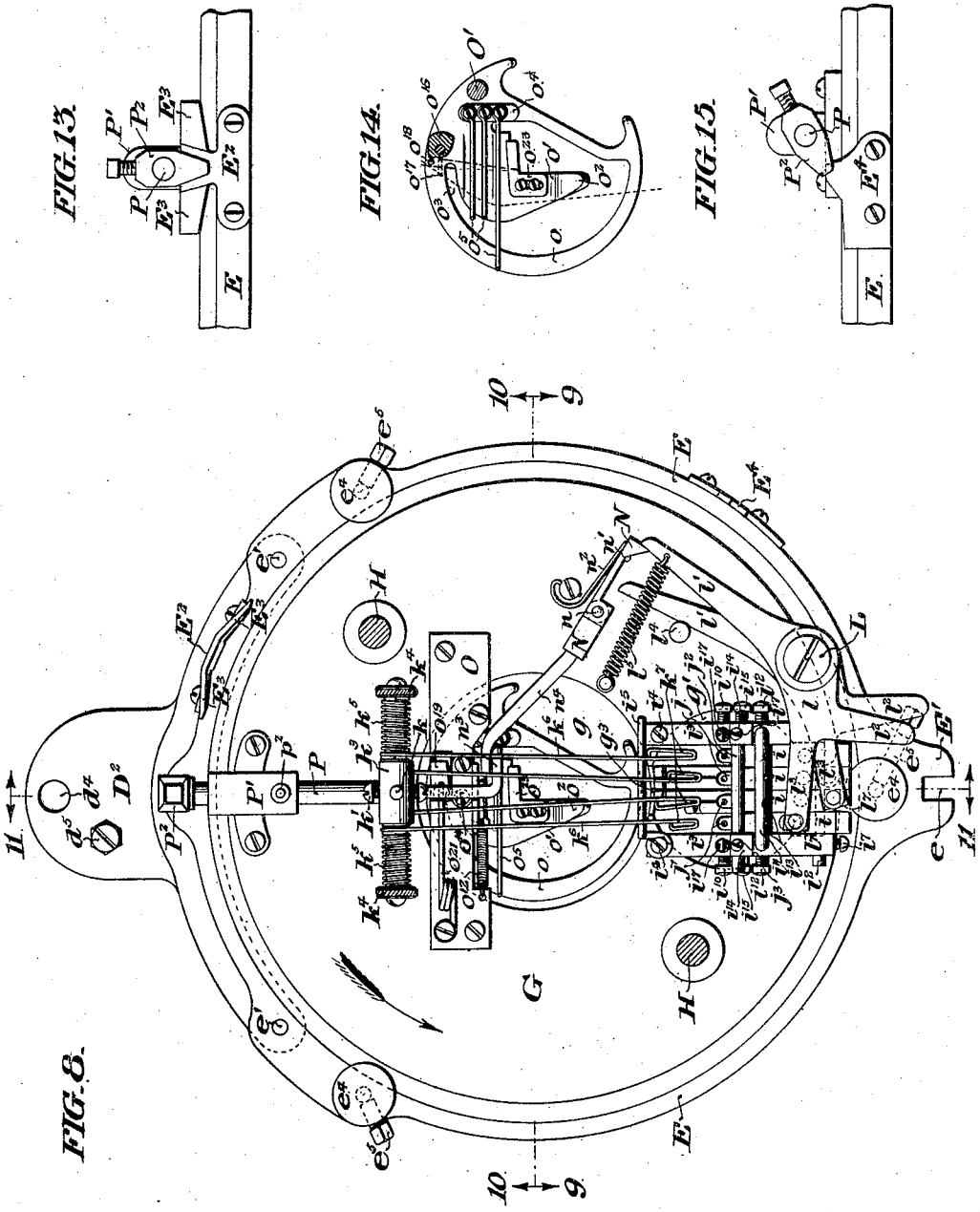
WITNESSES:
INVENTOR:

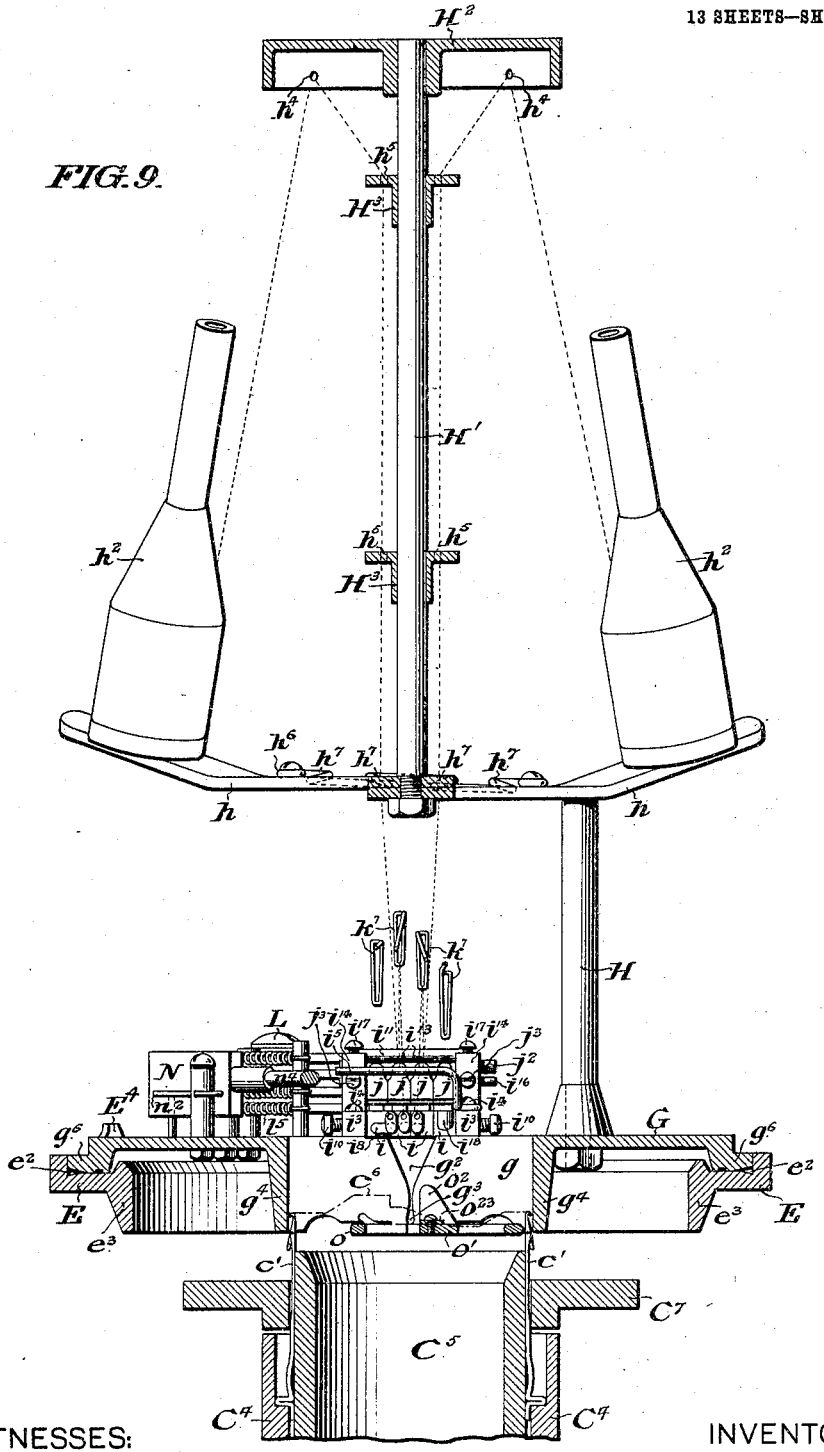

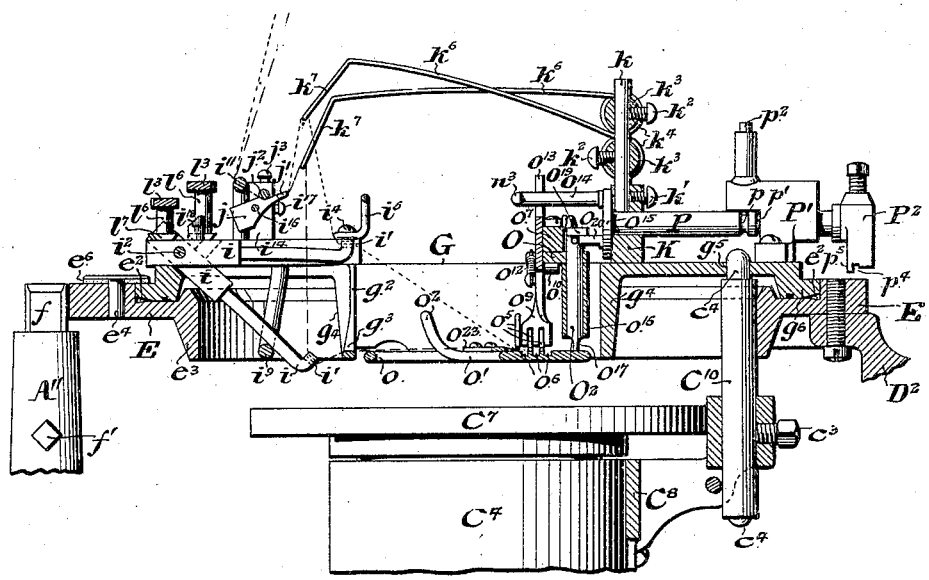

No. 794,407. PATENTED JULY 11, 1905.
E. A. HIRNER.
THREAD CHANGING MECHANISM FOR CIRCULAR KNITTING MACHINES.
APPLICATION FILED DEC. 20, 1900.

13 SHEETS—SHEET 11.

WITNESSES:

INVENTOR:

No. 794,407. PATENTED JULY 11, 1905.
E. A. HIRNER.
THREAD CHANGING MECHANISM FOR CIRCULAR KNITTING MACHINES.
APPLICATION FILED DEC. 20, 1900.

13 SHEETS—SHEET 12.

WITNESSES:
INVENTOR:

No. 794,407. PATENTED JULY 11, 1905.
E. A. HIRNER.
THREAD CHANGING MECHANISM FOR CIRCULAR KNITTING MACHINES.
APPLICATION FILED DEC. 20, 1900.

13 SHEETS—SHEET 13.

WITNESSES:
INVENTOR:

No. 794,407.

Patented July 11, 1905.

UNITED STATES PATENT OFFICE.

EMIL A. HIRNER, OF ALLENTOWN, PENNSYLVANIA.

THREAD-CHANGING MECHANISM FOR CIRCULAR-KNITTING MACHINES.

SPECIFICATION forming part of Letters Patent No. 794,407, dated July 11, 1905.

Application filed December 20, 1900. Serial No. 40,483.

*To all whom it may concern:*

Be it known that I, EMIL A. HIRNER, a citizen of the United States, residing in Allentown, in the county of Lehigh and State of Pennsylvania, have invented certain new and useful Improvements in Thread-Changing Mechanism for Circular-Knitting Machines, whereof the following is a specification, reference being had to the accompanying drawings.

My invention has reference to automatic mechanism applicable to knitting-machines, whereby at predetermined intervals the knitting-thread may be changed—that is to say, at certain points in the knitting operation the thread with which the knitting has proceeded is withdrawn from the needles and another thread inserted with which the knitting proceeds until a further change. Such mechanism is useful either where it is desired to knit with threads of different colors, so that the colors may be successively changed to produce knitting with colored stripes—as, for instance, in the manufacture of striped hosiery—or where it is desired to knit threads differing in weight or material—as, for instance, where the heel and toe pockets of a stocking are to be knit with a cotton thread and the rest of the stocking with a woolen thread.

My invention comprises not only the immediate mechanism for effecting the change of thread, but also the related mechanism whereby the intervals of change and selection of threads may be varied according to any predetermined pattern.

It also includes mechanism whereby as the threads are changed the loose ends, both of the old and new threads, are severed from the knitting and the ends of the threads which are out of use held under tension ready for use.

It further comprises devices whereby the pattern mechanism for regulating the change of thread is operatively connected with the automatic mechanism of a stocking-knitter, whereby the thread-changing mechanism is made to correspond to or control the changes in the operation of the knitting parts which produce the heel and toe pockets.

I have shown in the drawings and will proceed to describe an embodiment of my invention in which it is applied to a circular stocking-knitter of standard construction for the purpose of knitting multicolored striped hose; but it must be understood that my invention is not thus limited in application, but may be applied to the changing of threads in any sort of a knitting-machine. Four separate thread-changing devices are shown and means for automatically throwing them successively into and out of action according to a predetermined pattern in order to produce a striped stocking. This number might be increased. I have chosen this exemplification of my invention because it more fully illustrates all the details of my improvements; but it is to be understood that the number of thread-feeds may be decreased with a resulting simplification of the mechanism. Likewise, where the change of thread is to occur only at the knitting of the heel and toe pockets instead of in accordance with the pattern of a striped stocking there will be further simplification.

Figure 2:
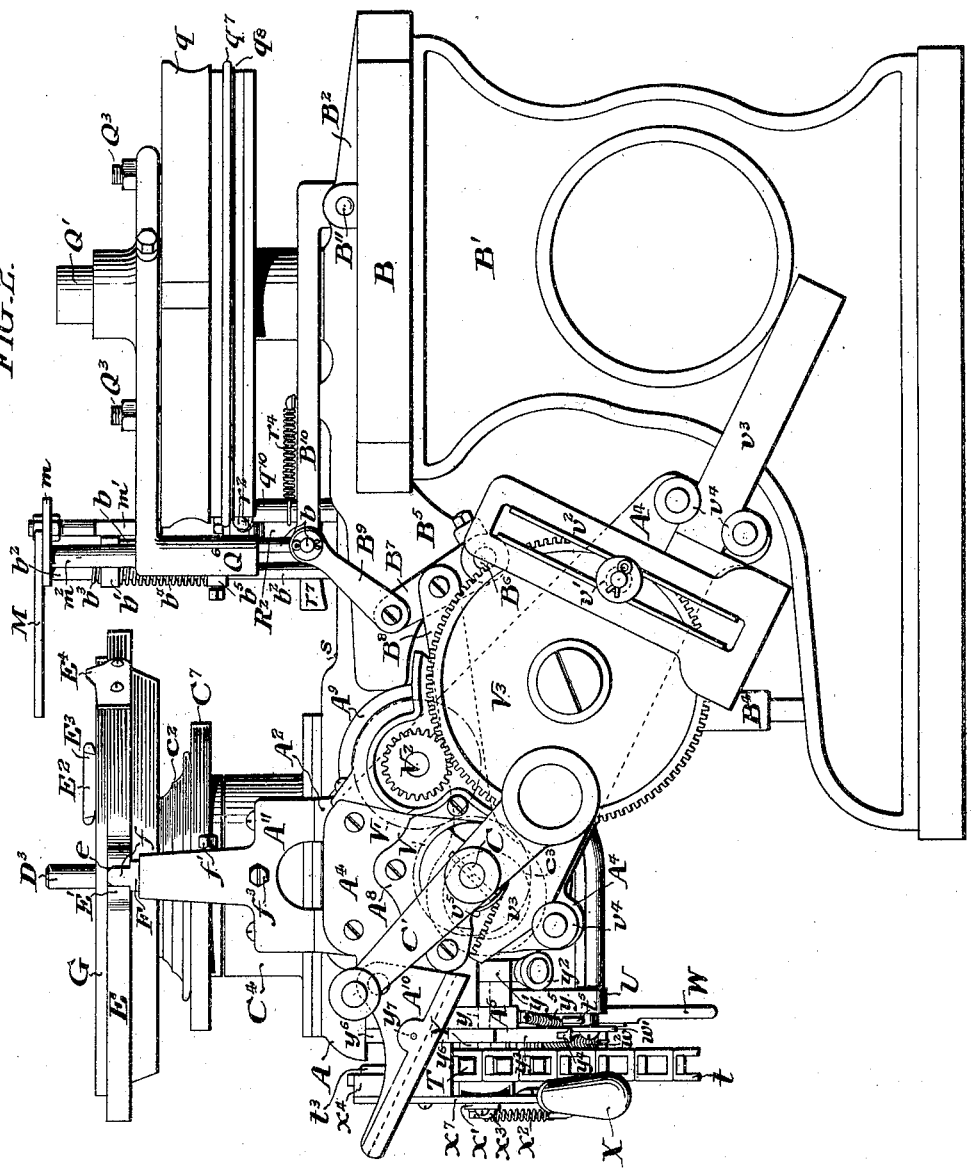
Figure 3:
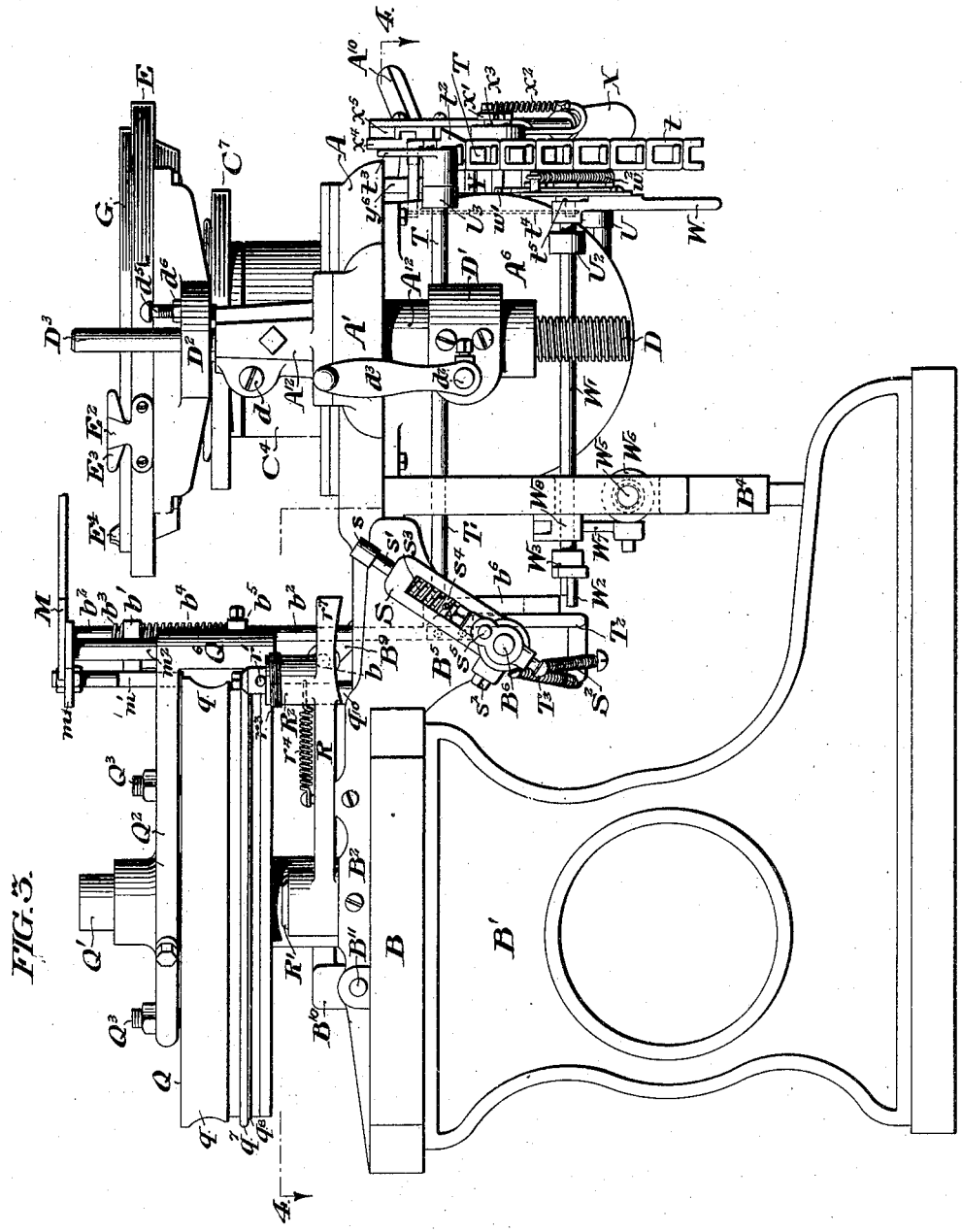
Figure 4:
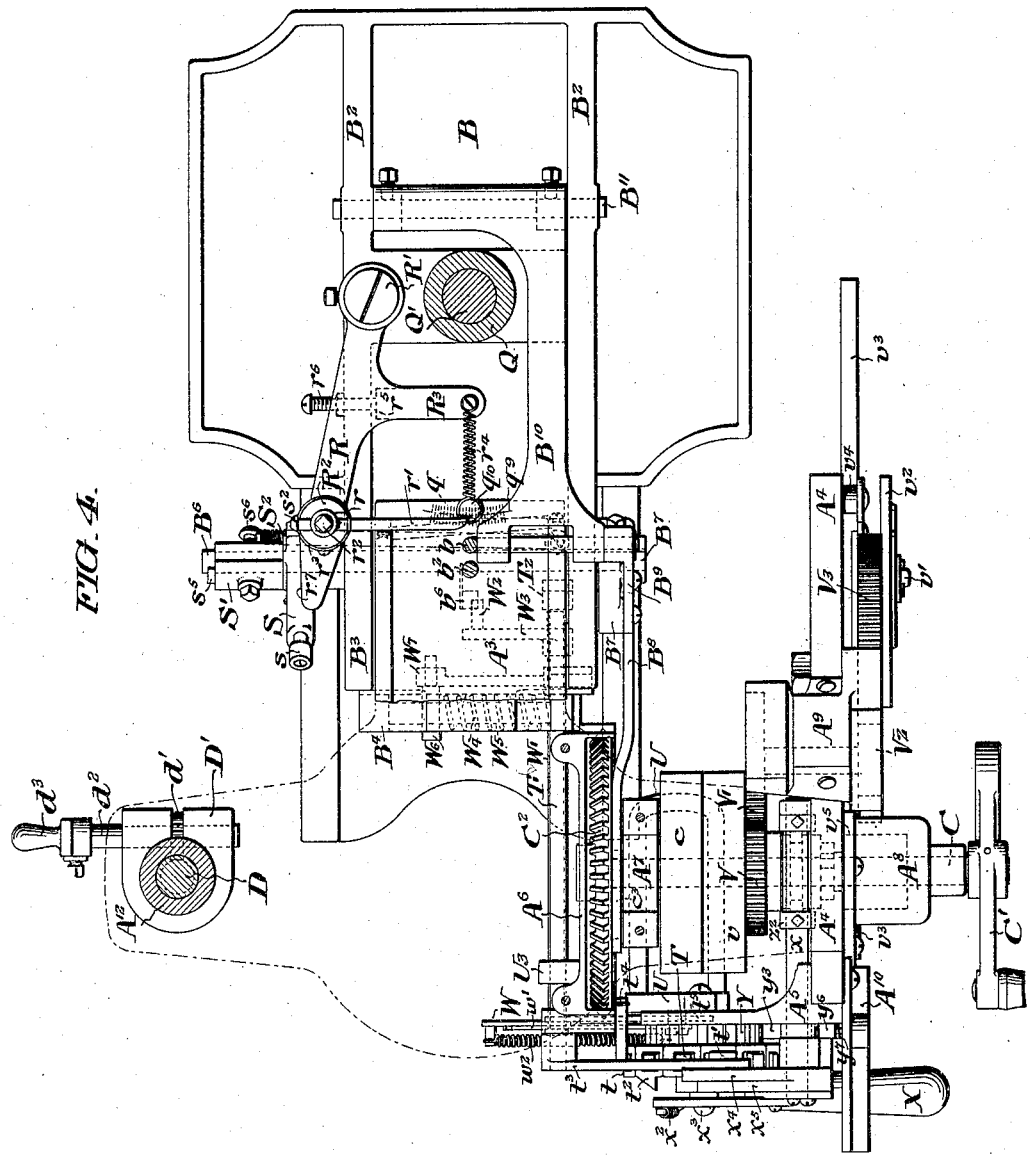
Figure 5:
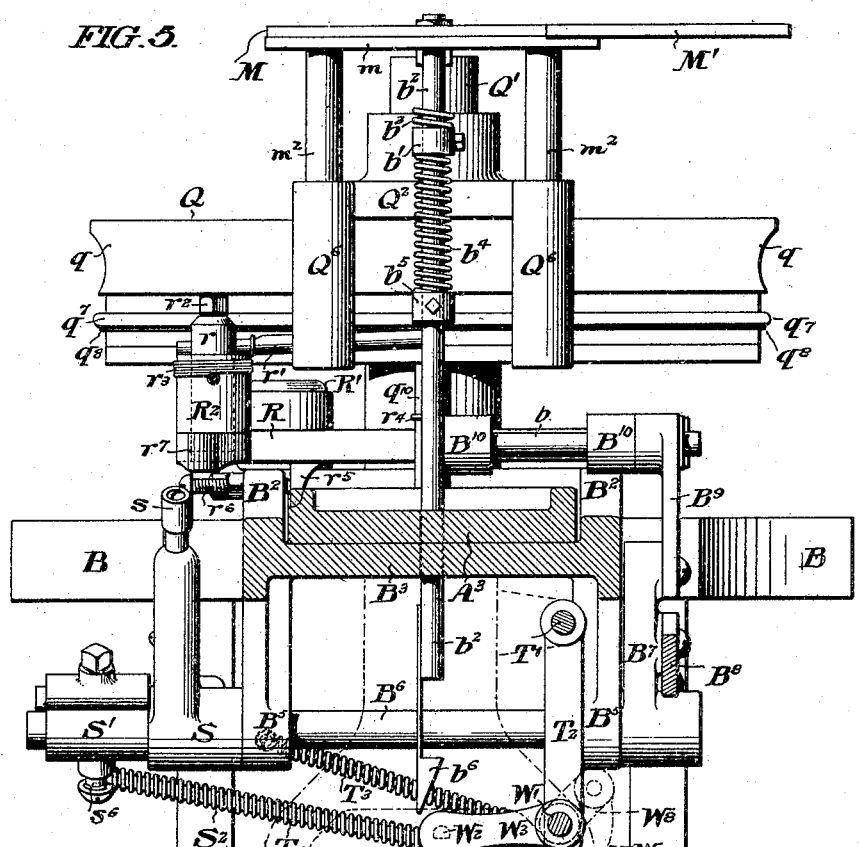
Figure 12:
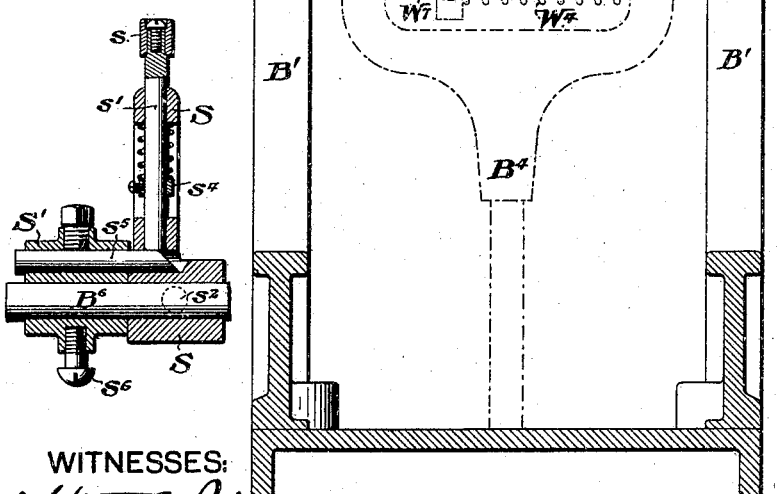
Figure 6:
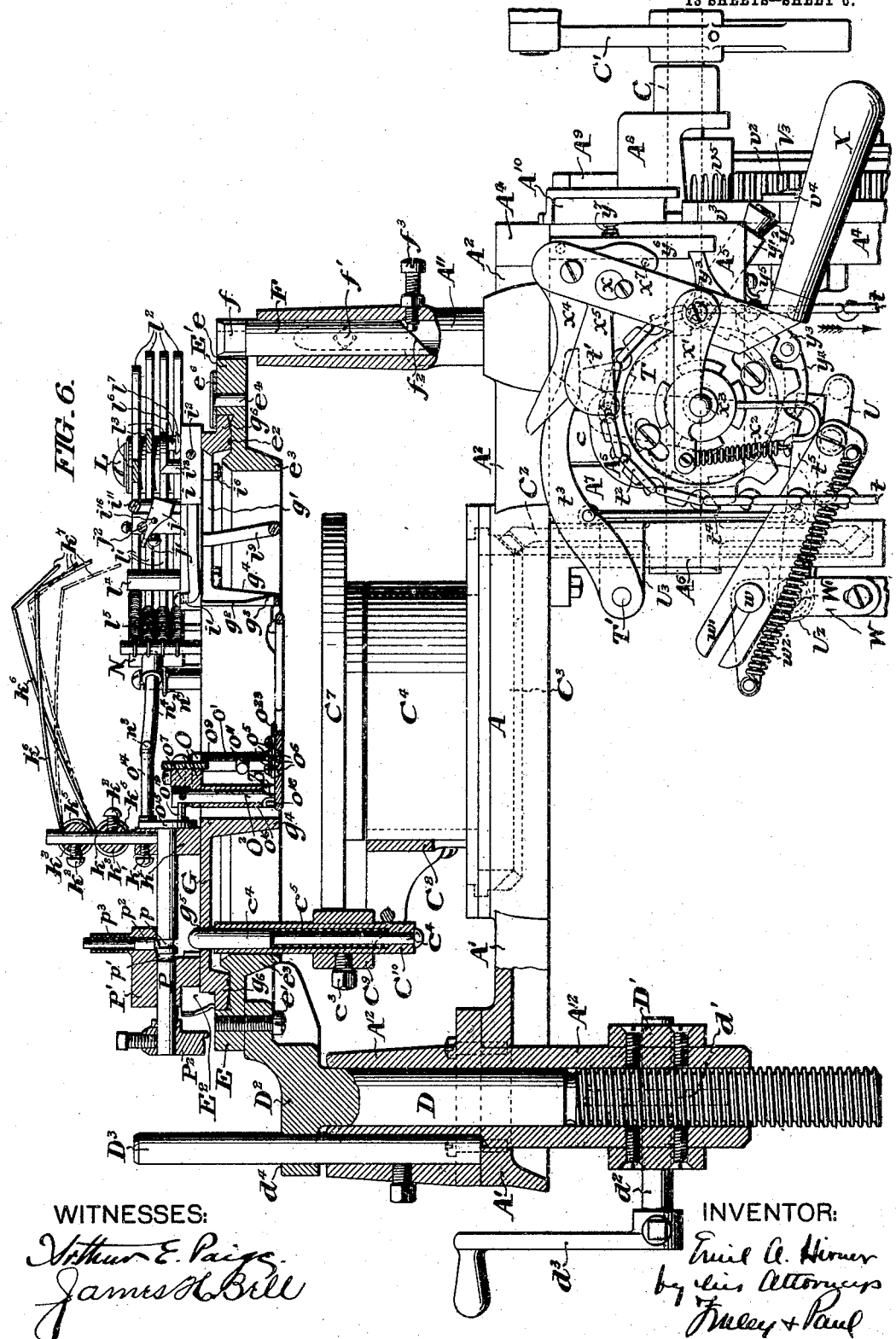
Figure 16:
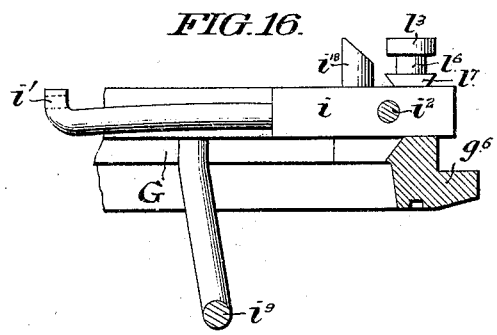
Figure 17:
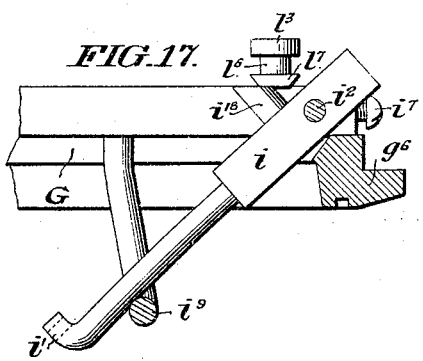
Figure 18:
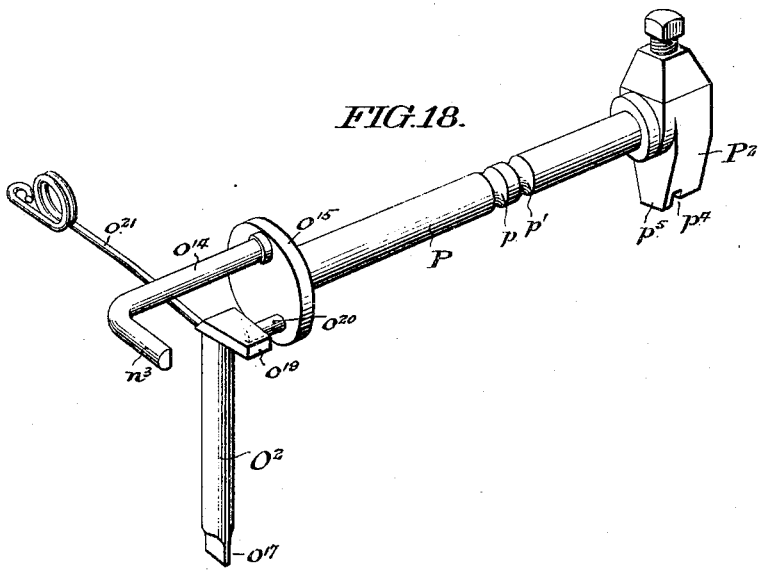
Figure 20:
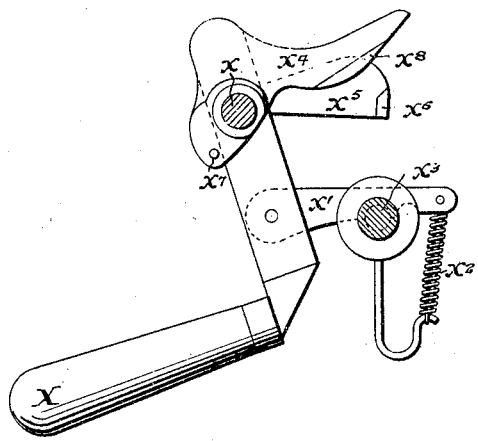
Figure 21:
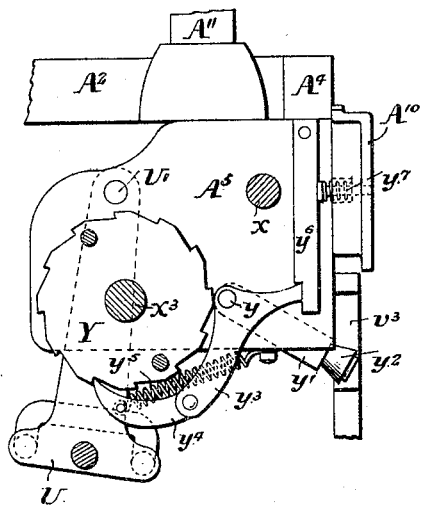
Figure 22:
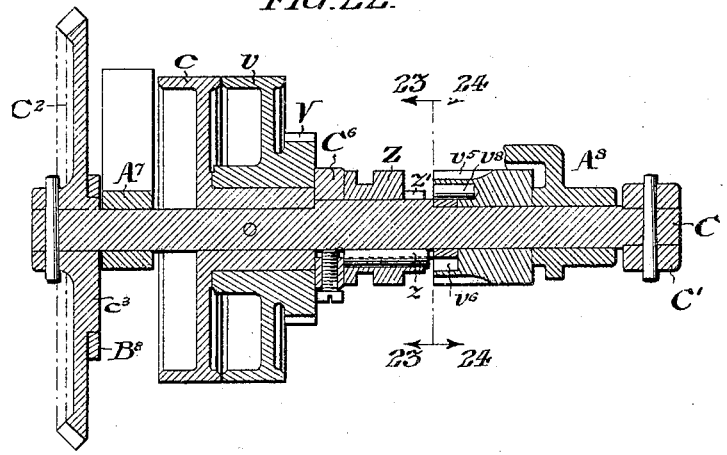
Figure 23:
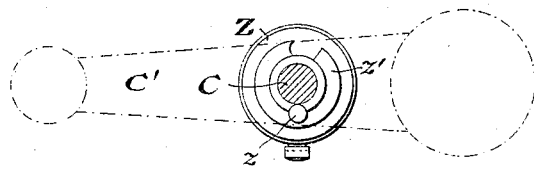
Figure 24:
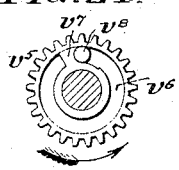

In the accompanying drawings, Figure 1 is a plan view of a knitting-machine embodying my improvements, the left-hand end of the figure constituting the front of the machine. Fig. 2 is an elevation of the machine seen from the right with the bobbin-carrier removed. Fig. 3 is a similar elevation seen from the left. Fig. 4 is an irregular sectional plan view taken on the line 4 4, Fig. 3. Fig. 5 is a vertical cross-section taken on the line 5 5, Fig. 1, slightly enlarged. Fig. 6 is a fragmentary vertical cross-section along the line 6 6, Fig. 1, similarly enlarged. Fig. 7 is a fragmentary vertical sectional view along the line 7 7, Fig. 1. Fig. 8 is an enlarged plan view of the swinging table, which overlies the knitting-machine, with the bobbin-carrier removed. Figs. 9 and 10 are vertical longitudinal sections of Fig. 8 along the line 9 9 10 10, looking in Fig. 9 from the left of the machine and in Fig. 10 from the right. In Fig. 9 the bobbin-carrier is in place; in Fig. 10 it is removed. Fig. 11 is a vertical cross-section of Fig. 8 along the line 11 11 and looking from the rear, corresponding thus to Fig. 6, but looking in the opposite direction. The remaining figures are detailed views of parts, as follows: Fig. 12 is a section of collar S', showing the relation of its parts to those of arm S. Fig. 13 is a view in elevation of the relation between cam-plate $E^2$ and cam-block $P^2$. Fig. 14 is a top view of thread-end-guide plate $o$. Fig. 15 is a view in elevation of the relation between cam-plate E' and cam-block $P^2$. Figs. 16 and 17 are enlarged views of thread-changer $i$ in upper and lower positions, respectively. Fig. 18 is an enlarged perspective view of rock-shaft P and its connections with hammer $O^2$. Fig. 19 shows the shape of the different varieties of pattern-jacks for pattern-wheel Q. Fig. 20 is a view of the rear side of hand-lever X. Fig. 21 is a fragmentary elevation showing in detail the pawling mechanism for the pattern-chain $e^4$. Fig. 22 is a cross-section along the main shaft $A^5$, showing its pulleys and clutch mechanism. Figs. 23 and 24 are sections along the line 23 23 24 24, Fig. 22, looking, respectively, from the right and from the left.

In order that the drawings may be more easily understood, it will be convenient to first enumerate and refer to the fixed parts by which the mechanism proper is supported, although these parts are not essential to my invention, as the moving mechanism may be supported in any way which is found convenient. I will therefore first specify these parts.

*The mountings.*—A (see Fig. 6) is the bedplate, which carries the knitting-cylinders. It is of circular outline, with a left-hand wing-plate A', a right-hand wing-plate $A^2$, and the rearwardly-projecting ledge $A^3$. The bed-plate and its wing-plates are integral and are cast with a depending marginal flange. They have screwed or otherwise made fast to them the following fixed supporting parts: to the right of plate $A^2$ a dependent plate $A^4$, in front of and below plate $A^2$ a journal-plate $A^5$, (secured only to the preceding member,) to the left of plate $A^2$ a depending guard-plate $A^6$, below plate $A^2$ and between $A^4$ and $A^6$ (nearer to the latter) a journal-block $A^7$, to the right of plate $A^4$ and screwed to it an irregular journal-casting $A^8$, behind plate $A^4$ and screwed to it an irregular cap-piece $A^9$, in front of plate $A^4$ and screwed to it a guard-plate $A^{10}$, and on top of wing-plate $A^2$ an upright standard $A^{11}$. The left-hand wing-plate A' carries centrally a large sleeve $A^{12}$, which passes through it, projecting both above and below it.

All of the foregoing parts find their support in an octagonal table B, which is supported by wide side standards B' B'. Its top is cast with two intermediate longitudinal ribs $B^2$, between which the top is projected forward in the form of a shelf $B^3$, to which is screwed the rearwardly-projecting ledge $A^3$ of the bed-plate A, which, with all its parts, is thus supported by table B. Additional support is given the front of shelf $B^3$ by means of the bifurcated central standard $B^4$, Figs. 3, 5, and 7. The ledge $B^3$ is cast with heavy depending journal-flanges $B^5$, one on either side.

The comprehension of the mechanism of my invention as I have illustrated it will be facilitated by dividing its decription into groups, as follows:

I. The parts which relate to the knitting mechanism proper.

II. The swinging table and its rotating plate.

III. The immediate thread-changing mechanism mounted on the rotating plate, comprising: $a$, multiple bobbin-carrier; $b$, multiple thread-changers; $c$, thread-locks and take-ups; $d$, levers which control the thread-changers.

IV. The thread-end guide-plate and thread-cutting mechanism.

V. The cam-plate which actuates the levers and its reciprocating mechanism.

VI. The pattern-wheel and its pawling mechanism.

VII. The mechanism for changing rotation to oscillation, and vice versa, comprising: $a$, oscillating mechanism; $b$, automatic clutch and clutch-lever; $c$, pattern-chain and its pawling mechanism; $d$, belt-shifting lever.

VIII. Connections whereby pattern-wheel determines change from rotation to oscillation.

IX. Connections whereby motion of pattern-wheel ceases during oscillation.

I. *The Parts which Relate to the Knitting Mechanism Proper.*

The main shaft C of the machine runs transversely beneath wing-plate $A^2$. (See Figs. 4, 6, and 22.) It is journaled toward its left end in journal-block $A^7$ and toward its right end in journal-casting $A^8$. The right-hand projecting extremity of this shaft has detachably keyed to it a hand-lever C', by which the shaft may be turned by hand and with reference to a fixed position of which (as indicated in the drawings, Fig. 2) it is convenient to adjust the initial position of the machine. The left-hand extremity of this shaft carries the vertical beveled gear-wheel $C^2$, which meshes with a corresponding horizontal circular rack formed on the lower edge of an annular flange $C^3$, which is mounted upon and rotates centrally within bed-plate A. Flange $C^3$ has formed upon it the rotating cam-cylinder $C^4$. The corresponding needle-cylinder $C^5$ is sustained fixedly within the cam-cylinder.

Shaft C carries twin fast and loose belt-pulleys $c$ and $v$. Pulley $c$ is fast to the shaft and is the ordinary driving-pulley of the machine. Pulley $v$ runs freely upon a projecting sleeve of pulley $c$, being maintained in place by collar $C^6$, set on the shaft, (see Fig. 22,) and is ordinarily an idle pulley for supporting the belt while the machine is at rest, although through the gearing and clutch mechanism, which will hereinafter be described, pulley $v$ is further utilized to effect oscillation of the machine when this motion is needed.

$c'$ $c'$, Figs. 9 and 10, are the needles, working vertically in needle-grooves around the periphery of the needle-cylinder under the influence of the cams of the cam-cylinder. The knitting-cams and other connecting parts are not shown, as they may be of any well-known construction. It will be understood that the cam-cylinder is furnished, in addition to the ordinary knitting-cams, with needle shifters or picks and with mechanism for throwing them into and out of action at the proper time, by means of which a continuous tube is formed by the continuous rotation of the cam-cylinder around the needle-cylinder, while at proper intervals the machine is caused to oscillate and pockets are formed in the tube by throwing a number of the needles to the idle level and widening and narrowing the fashioning set by the action of the picks, all of which mechanism is well known in the art of knitting. The cam-cylinder also carries a series of sinkers, which are omitted from most of the drawings; but the general contour of the ring formed by the series is indicated at $c^2$, Fig. 2. These sinkers are actuated by sinker-cams carried by a dial-plate $C^7$, which revolves with the cam-cylinder. By the operation of these parts the rotation of the main shaft by the belt-pulley $c$ continuously rotates the cam-cylinder and produces continuous knitting. When the belt is shifted to $v$ and certain connections made, the main shaft is given a motion of oscillation instead of rotation, with corresponding oscillation of the cam-cylinder, whereby the formation of the heel and toe pockets is accomplished. The connections whereby rotation of pulley $v$ causes oscillation of the main shaft are described at VII $a$.

II. *The Swinging Table with its Rotating Plate.*

Within sleeve $A^{12}$, mounted on wing-plate $A'$, plays a rotating and sliding rod D, having a screw-thread formed upon its lower portion, which, however, operates not as a screw, but as a rack. The upper portion of this sleeve is split, so that it may be adjusted to fit accurately around rod D by screw $d$, Fig. 3. A second sleeve D' surrounds sleeve $A^{12}$ near its lower end and carries within it a vertical pinion D', (see Fig. 4,) which reaches through a vertical slot in the side of the sleeve $A^{12}$ and engages the threaded portion of the rod D as a rack. It is rotated by its shaft $d^2$ when turned by the hand-lever $d^3$ and by its rotation moves the rod D up and down, the screw-thread allowing a coincident rotary movement. The upper end of rod D, which projects above the sleeve $A^{12}$, is expanded into an irregular horizontal head $D^2$.

$D^3$ is a vertical guide-rod set at its lower end in the side of sleeve $A^{12}$. The head $D^2$ contains a circular aperture $d^4$, corresponding to and fitting around the guide-rod $D^3$, which thereby maintains head $D^2$ and rod D from rotation within the sleeve $A^{12}$ until the head has been raised far enough to clear the upper end of the guide-rod; but when so raised it is free to swing in either direction upon the rod D as a pivot.

The annular swinging table E is made fast at one side to head $D^2$ by the screws $e'$, two of which are situated near the extreme ends of the wing-shaped extensions of the head. (Indicated by the dotted lines in Fig. 8.) The table E at the side directly opposite the head $D^2$ has a projection E' with a radial locking-slot $e$. The upper end of standard $A^{11}$, which is mounted on plate $A^2$, contains the vertical locking-key F, on the upper end of which is formed a lug $f$, which accurately fits the slot $e$ of the swinging table when the latter is swung into its operative position concentric with the axis of the knitting-cylinders. The key F is held with its upright lug $f$ radial to the axis of the knitting-cylinders, ready to engage the radial slot $e$, by the set-screw $f'$, the end of the screw opposing a flattened side of the key, as indicated.

The lower end of the key F is beveled at $f^2$, at which point it is engaged, and may be vertically adjusted by a horizontal set-screw $f^3$. This adjustment regulates the height of the shoulder at the base of lug $f$, on which the swinging table rests when in place. A corresponding adjustment of the other support of the table may be effected by the set-screw $d^5$, which pierces the head $D^2$ and abuts at its lower end against the top of the sleeve $A^{12}$, fixing the depth to which the slide-rod D can fall within the sleeve.

By rotating lever $d^3$ the parts described enable the operator to raise the swinging table until the aperture $d^4$ leaves the guide-rod $D^3$, in which position, the slot $e$ being clear of the lug $f$, the whole table is free to be swung to one side or the other, giving the operator access to the needle-cylinder and cam-cylinder and other portions of the knitting-machine proper, which are beneath the table when it is in its central or operative position.

The annular swinging table E carries concentrically the annular rotating plate G, upon which is mounted the multiple-thread-feeding mechanism. This rotating plate has a depending external peripheral flange $g^6$, which fits into a corresponding annular groove $e^2$ of the swinging table. A short distance within the groove the entire table is cut away, terminating in the depending flange $e^3$, forming a large central circular aperture. It will be observed that this annular plate is wholly external to the cylindrical plane formed by the indefinite prolongation of the needles, which relation is shortly described in some of the claims by the statement that this annular plate is external to the cylindrical surface defined by the needles. The plate G is held to its place in the table E by the overlapping heads of the pins $e^4$, protected by washers $e^6$, each of them having its height adjustable by set-screw $e^5$.

On one side of the cam-cylinder $C^4$ is fastened a plate $C^8$ with brackets, which carry between their outer extremities a block $C^9$, in which a vertical sleeve $C^{10}$ is held adjustably by set-screw $c^3$. Within the sleeve $C^{10}$ is a vertical pin $c^4$ with a rounded upper end. A spiral spring $c^5$, surrounding the pin within the sleeve and abutting against a shoulder of this pin, tends to thrust it as far up as the expanded head at its lower end will permit. When thus thrust up, the upper end of this pin engages a circular aperture $g^5$ of the rotating plate G. Through the engagement of this pin in this aperture rotation of the plate G is effected, corresponding to that of the cam-cylinder $C^4$. If the swinging table has been swung aside, as soon as it returns to its central position in the course of the first rotation of the cam-cylinder this pin will find and engage the aperture $g^5$ and thereafter constantly rotate the plate. Until the aperture is found the pin yields to depression within its sleeve, thus offering when properly adjusted by set-screw $c^3$ no obstacle to the return of the swinging table to its place.

The rotating plate G has a central circular aperture $g$ slightly larger than the needle-cylinder, with the internal depending flange $g^4$. It also contains a second smaller aperture to one side of the central aperture $g$, (indicated by $g'$, Figs. 1 and 8.) The flange $g^4$ depends far enough for its lower edge to surround the heads of the needles in the needle-cylinder. Where the central aperture $g$ and the aperture $g'$ are contiguous, they open into each other, and the flange $g^4$ is cut away at this point to form a deep V-shaped thread-groove $g^2$, reaching almost but not quite to the bottom of the flange. The bottom or point of this groove, which is slightly enlarged, forms the thread-carrier $g^3$ of the knitting-machine. (See Fig. 9.) The relation of the position of this thread-carrier to the needles should be carefully noted. As shown in the drawings, the table has been swung to its central and locked position and the cam-cylinder rotated until the pin $c^4$ engages the aperture $g^5$ and until the thread-carrier $g^3$ of the rotating plate is directly to the right of the central aperture $g^5$. This is the initial position of the machine. The position of aperture $g^5$ in the rotating plate is such that the plate G when rotating is held in such fixed relation to the cam-cylinder, and therefore to the knitting-cams within it, that the line representing the advancement of the tops of the needles under the influence of these cams is always related to the plate, and therefore to thread-carrier $g^3$, as indicated by the dotted line $c^6$, Fig. 9. The vertical position of the thread-carrier with relation to the needle-cylinder must always be such that any thread fed through it will enter and be knit by the hooks of the needles. Its accurate adjustment is important and is effected by the adjustment of the height of the swinging table E, which has been described as made by the set-screws $d^5 f^3 c^3$.

III. *Immediate Thread-Changing Mechanism.*

All of this mechanism is mounted on rotating plate G. It comprises:

*a. Multiple bobbin-carrier.*—Two upright standards H H, Figs. 8 and 9, made fast to plate G, sustain two horizontal cross-pieces $h$ $h$, Fig. 1, united in the shape of an X. Each of the four extremities of the X (which are bent slightly upward) carries a bobbin-pin $h'$, on which are placed the bobbins $h^2$. From the intersection of the cross-pieces $h\ h$, and consequently directly over the axis of the machine, rises the single upright standard H'. The upper extremity of the standard H' is expanded into the thread-guiding disk $H^2$, through a depending peripheral flange of which are pierced the thread-guiding apertures $h^4$, one corresponding to each of the bobbins $h^2$. $H^3\ H^3$ are smaller thread-guiding collars mounted upon the standard H', with similar thread-guiding apertures $h^5$. Between two arms of the cross-bars extends the guide-wire $h^6$, looped to form the thread-guiding eyes $h^7$.

*b. Multiple thread-changers.*—Over the aperture $g'$ are mounted the four pivoted thread-changers $i\ i\ i\ i$. (See Figs. 8, 9, and 11.) These may be seen in enlargement in Figs. 16 and 17. They are of equal length and each consists of a pivoted lever, of which the swinging extremity is turned up and pierced with a thread-eye $i'$. Their pivoted ends are squared, so as to insure the more accurate parallelism of their motion as they swing vertically upon the pivot $i^2$, which is common to all four of them. This pivot $i^2$ is mounted between two parallel bars $i^3$, which bridge the aperture $g$, being secured at their inner ends to the plate G by the screws $i^4$ and at their outer ends to the same plate by the screws $i^6$, with heads beneath the plate. (Showing only in Fig. 6.)

$i^7\ i^7$ are the set-screws at the end of the bars $i^3$ for the purpose of setting, retaining, and removing the pivot $i^2$, on which the thread-changers swing. It will be observed that when these parallel thread-changers are in their horizontal position their swinging ends carrying the thread-eyes are over that part of the aperture $g'$ which is nearest to the aperture $g$, and consequently are in close proximity to the top of the V-shaped thread-groove $g^2$. In order to bring their swinging extremities more nearly together, the outermost two of the thread-changers may be formed with a shoulder $i^8$. (Seen end on in Fig. 9.) The bars $i^3$ carry a depending wire yoke $i^9$ with its ends adjustably secured in them by the set-screws $i^{10}$ and having a sufficient depth for its crosspiece to form a rest which catches the swinging extremities of the thread-changers $i$ when they are depressed, (as is the farthest thread-changer seen in Fig. 11.) When thus depressed, the thread-eye of the thread-changer is slightly below thread-carrier $g^3$, the exact extent depending upon the adjustment of yoke $i^9$ by set-screws $i^{10}$. Consequently when any one of the thread-changers is depressed it lays its thread in the thread-carrier $g^3$, and when it is raised it removes its thread from this thread-carrier.

The upper side of each thread-changer carries a short upright post $i^{18}$, set slightly in front of its pivot and with its top beveled toward the pivot. (See Figs. 16 and 17.) The function of these posts will be explained in connection with the description of the operation of the levers which control the thread-changers. (III $d$.)

*c. Thread-locks and take-ups.*—The bars $i^3$ also carry an upwardly-projecting wire yoke $i^{11}$, held in place by set-screw $i^{12}$ and pierced by thread-apertures $i^{13}$. A second upwardly-extending yoke bridges the space between the bars $i^3$ formed by the upright posts $i^{14}$, set in each of them by set-screws $i^{15}$. Between these posts runs the pivot $i^{16}$, set by the screws $i^{17}$. The pivot $i^{16}$ carries four pivoted levers $j$, which I call "thread-locks," of which the outer ends are weighted, while the inner ends are pierced by the thread-apertures $j'$. These thread-locks are held in a position nearly horizontal by the stop-wire $j^2$, which runs between the posts $i^{14}$ and is set in them by the set-screws $j^3$.

On the opposite side of the aperture $g$ from the parts which have just been described is mounted the base-block K. This block supports the upright post $k$, set in it by the screw $k'$. On the post $k$ are set by screws $k^2$ two horizontal arms $k^3$, one directly above the other. Each of the four ends of these two arms carries a milled tension-screw $k^4$. From attachments in these screws are led the coiled tension-springs $k^5$, which after spirally incasing part of the arm spring over the aperture $g$ and form the take-ups $k^6$, all four being parallel and terminating in the vertically-elongated eyes $k^7$, one of which is approximately over the swinging extremity of each of the thread-changers $i$. A horizontal stop-wire $i^5$, made fast at one end to one of the screws $i^4$, bridges over the top of the thread-groove $g^2$ and prevents the take-ups $k^6$ from descending too far.

It will now be convenient to trace the course of the thread from the bobbin to the eye of the thread-changer, which when depressed places its thread in the thread-carrier $g^3$, by which it is fed into the needles. From the bobbin $h^2$ each thread passes through thread-apertures $h^4$ $h^5$ $h^5$, through its eye $h^7$ in wire $h^6$ to its appropriate aperture $i^{13}$ of the yoke $i^{11}$. From this latter aperture each of the threads passes under the stop-wire $j^2$, and thence down through the thread-aperture $j'$ of one of the thread-locks, thence through one of the take-up eyes $k^7$ and down through the eye of its appropriate thread-changer $i$.

By tracing the course of the thread in Fig. 11, which belongs to the thread-changer nearest the observer and which is in its upper or horizontal position, it will be seen that the take-up eye exercises its force to bind its thread against the stop-wire $j^2$ by pulling the swinging end of the thread-lock up against the stop-wire. The depression, however, of one of the thread-changers pulls its thread more nearly horizontal between the end of the thread-lock and the wire $i^5$, drawing the tension-eye $k^7$ far enough down to release the pressure of thread-lock $j$ upon stop-wire $j^2$, due to the former's weighted end, leaving the thread free to run under the stop-wire $j^2$. It will thus be seen that while the thread is freely fed from its bobbin to any one of the thread-changers, which by its depression has pulled down its take-up, the thread is locked, when the thread-changer with its take-up flies up, in which position the take-up is forced to exert its whole tension on the end of the thread. The result of the combined action of these parts is therefore that the depression of any one of the thread-changers $i$ places its thread in the thread-carrier $g^3$, whence it is fed to the needles, while its elevation withdraws its thread from the action of the needles. It is therefore proper to next describe the mechanism by which these thread-changers are successively depressed and raised, whereby the threads are successively thrown into and out of action.

*d. Levers which control the thread-changers.*—The upright post L, which is set in plate G in proximity to the aperture $g'$, has pivoted upon it four horizontal cam-actuated levers $l$, one above the other. Each of these levers has three arms—a long arm $l'$, a cam-arm $l^2$, and a short arm $l^3$. An upright post $l^4$, set in plate G, serves as a stop for all the levers in one direction. Their motion in the opposite direction is opposed by springs $l^5$, one for each lever. These levers are of similar shape, except the short arms $l^3$, which decrease in length from the topmost lever to the bottommost one, so that their extremities correspond successively in position to the pivoted ends of the four thread-changers $i$, each thread-changer thus having the extremity of one of the arms $l^3$ playing directly over its pivot. In the extremity of each of these arms $l^3$ is set a depending post $l^6$, terminating in a shoe $l^7$. The length of the post is in each case such that its shoe reaches to the top of the square end of the thread-changer to which it corresponds. The position of the levers $l$ is such that their motion within the limits about to be described causes the arm $l^3$ of each one, with its shoe, to slide over the top of its thread-changer from one side of the pivot $i^2$ to the other, so that when the arm $l^3$ is in its outermost position its thread-changer is raised by the pressure of the shoe $l^7$ against the end of the thread-changer beyond the pivot, while when the lever $l^3$ is in its innermost position its thread-changer is depressed by the pressure of its shoe $l^7$ against the top of the post $i^{18}$, with the bevel of which it has come into contact. Thus the moving of any one of the levers $l$ positively raises or depresses its corresponding thread-changer. As plate G rotates movement of the levers $l$ is caused by contact of their cam-arm $l^2$ with a vertically-movable cam-plate M, Fig. 1, with cam edge M'. According as this cam is raised or depressed by mechanism to be described, the levers $l$, as these are rotated successively, come into contact with cam edge M' and depress their thread-changers, throwing the corresponding thread into the thread-carrier $g^3$. It is, however, necessary that the movements of these thread-changers shall not be independent of each other, but that they shall be so connected that the depression of any one of the thread-changers necessarily brings about the raising of any other one which has been previously depressed. This is effected as follows: A trigger-plate N, Figs. 8 and 9, is pivoted to plate G on the upright post $n$. This trigger-plate moves between stop $n'$ in one direction and spring $n^2$ in the other direction. Its tripping extremity is blunt at the end and furnished with a beveled surface at the side. Its position is so related to that of the levers $l$ that when any one of them is moved so as to depress its thread-changer its long arm $l'$ presses against the beveled surface of the trigger, pushing it against the spring $n^2$ until it is clear of the trigger, in which position the blunt end of the trigger holds the lever in opposition to spring $l^5$, fixed in position to depress its thread-changer, from which position it cannot be released until the trigger is again moved. When by reason of cam-plate M assuming a different vertical position another one of the levers $l$ is moved so as to depress its thread-changer, the motion of its long arm $l'$ in passing the trigger forces it out until the long arm of the lever which was last actuated is released and returned by spring $l^5$ to the position in which its thread-changer is raised. Thus the same motion of any one of the arms $l'$ which sets the lever in position to depress its thread-changer necessarily releases any lever which has previously been so set.

By the operation of the parts which have thus far been described the proper change in vertical position of cam-plate M throws any desired thread into thread-guide $g^3$, simultaneously removing any other thread which it has previously contained.

It will now be convenient to describe the circular thread-end-guide plate and the thread-cutting mechanism, whereby the loose end of each thread thrown into and out of action is at the proper point cut and held ready for further use.

IV. *The Thread-End-Guide Plate and Thread-Cutting Mechanism.*

The central aperture of rotating plate G is bridged transversely on the side farthest from the aperture $g'$ by a plate O. A post O' and a block $o^{16}$ depend from this plate into aperture $g$ and support centrally within it, and therefore in fixed relation to its depending flange $g^4$, the horizontal circular thread-end-guide plate $o$, which is figured separately in Fig. 14. This consists mainly of an annulus immediately within the circle of the heads of the needles. A part of the annulus being functionless, it is cut away, as seen in Fig. 14, to give the operator freer access to the needles. This annulus is formed with an inwardly-projecting tongue $o'$, the point $o^2$ of which turns upward, while its base forms a central platform for guide-plate $o$. Behind the base of this tongue on one side the aperture of the annulus is projected in the form of a curved slot $o^3$. The rear edge of this tongue is formed with a reëntrant angle the sides of which are overhung by a little L-shaped plate $o^{23}$, fastened to the top of tongue $o'$ by screws passing through slots in it, by means of which the width of the base of the tongue may be very accurately varied and adjusted.

A small plate $o^4$, which is fast to the upper surface of the plate $o$ near the base of the tongue, affords a support from which three wire arms $o^5$, fastened to plate $o^4$ by screws, project transversely across the base of the tongue $o'$. The wire arm nearest the center, which is a thread-guide, is longer than the others and has its end turned up, giving it the position and curvature seen in Fig. 10. The other two shorter arms press against the surface of the tongue, forming spring thread-clips. Between these wire arms parallel grooves $o^6$ are cut across the upper surface of the base of the tongue $o'$. A block $o^7$, which is set on top of the plate O near the middle of its inner edge, affords support for the horizontal pivot $o^8$ of the oscillating fork $o^9$. The oscillation of this fork is limited in one direction by the stop $o^{10}$ and in the other direction by the stop $o^{11}$, which projects from post O'. The position of the fork is such that the ends of its tines run within the grooves $o^6$ when the fork oscillates. It is held by means of spring $o^{12}$ normally as far to the left as stop $o^{10}$ will allow it to go, in which position the ends of its tines are clear of the top of the guide-plate $o$. The other end of this fork projects above its pivot in the form of a cam-arm $o^{13}$, which is engaged by the horizontal post $o^{14}$, projecting from a vertical disk $o^{15}$. By the partial rotation of disk $o^{15}$ this post acting on cam-lever $o^{13}$ pushes the tine end of the fork against the tension of spring $o^{12}$, its tines running in the grooves which have been spoken of to the other extremity of its play.

Block $o^{16}$, which has been referred to as one of the supports for plate O, is pierced vertically by an aperture within which slides the hammer $O^2$. The lower end of this hammer takes the form of a blunt knife-edge $o^{17}$, falling upon the upper surface of the thread-end-guide plate $o$, which acts as its anvil. The exact position of its abutment against this surface is indicated in Fig. 14 in the dotted lines $o^{17}$. Around this point the lower end of block $o^{16}$ is cut away. (See Fig. 10.) Immediately behind this position is a short stop-pin $o^{18}$, which projects a little way above the top of the plate. The top of the hammer $O^2$, projecting above plate O, is turned over, forming a horizontal finger $o^{19}$, (see Fig. 18,) which is engaged by a second horizontal post $o^{20}$, projecting from the disk $o^{15}$. The hammer is lifted by this post $o^{20}$ when the disk is partially rotated, but otherwise is forced down upon plate $o$ by means of the spring $o^{21}$, one extremity of which engages the hammer near its top, while the other extremity is secured to the top of the plate O. The vertical disk $o^{15}$, by the partial rotation of which both the fork and the hammer are operated, is mounted on the end of a radial rock-shaft P, the inner end of which is journaled within block K, mounted on plate G. Near its outer extremity this rock-shaft is also journaled in block P', made fast to the plate G near its periphery. Within the latter journal the rock-shaft has cut in it two circular grooves $p\ p'$. A vertical pin $p^2$ slides in the top of block P', being forced down by a coiled spring $p^3$, surrounding the pin. The lower rounded end of this pin engages one or the other of the circular grooves $p\ p'$ of rock-shaft P and permits the rock-shaft to slide lengthwise from its outer to its inner position against the pressure of spring $p^3$. The outer end of rock-shaft P, projecting slightly beyond plate G over the periphery of table E, carries a tappet $P^2$, the lower part of which is formed with a cam-groove $p^4$ and a cam-surface $p^5$. Around the periphery of table E are two fixed cams, one of which, $E^4$, has an upwardly-projecting cam-incline, (seen in enlarged detail in Fig. 15,) while the other, $E^2$, is furnished with bent cam-wings $E^3$, the outer surfaces of which act as cam-inclines. The rock-shaft P is normally in its outer position, as seen in Fig. 8, pin $p^2$ being in engagement with groove $p$. In this position when plate G is rotated tappet $P^2$ is clear from contact with either of the cams which have just been referred to. The shifting of the rock-shaft P from its outer position to its inner position is effected as follows: Post $o^{14}$, projecting from disk $o^{15}$, has its extremity turned over to form a finger $n^3$. Trigger-plate N projects beyond its pivot in the direction opposite to its tripping end in the form of a bent arm $n^4$, the extremity of which engages the finger $n^3$, which is normally in horizontal position ready for this engagement, as seen in Fig. 18, being held in this position by the combined action of springs $o^{21}$ and $o^{12}$. Whenever trigger N is tripped by the motion of one of the levers $l$ in effecting a change of thread, arm $n^4$ engages finger $n^3$, draws the rock-shaft P from its outer to its inner position, arm $n^4$ immediately returning to its former position. When rock-shaft P is in its inner position, the cam-groove and cam-surface of the tappet $P^2$ are both in position to engage, when plate G is rotated, the cam-inclines of the fixed cams $E^2\ E^3$. The direction of rotation of plate G is opposed to the hands of a watch, as indicated by the arrows, Figs. 1 and 8. This rotation brings cam-groove $p^4$ of tappet $P^2$ in contact first with cam $E^4$. As the block rides up the incline of this cam, as seen in Fig. 15, it oscillates rock-shaft P, with its terminal disk $o^{15}$, something over an eighth of a revolution, effecting, through the mechanism which has been described, the oscillation of fork $o^9$ and the raising of hammer $O^2$. When the summit of the cam-incline of cam $E^4$ has been reached, the cam-groove $p^4$ is suddenly freed from cam $E^4$ and rock-shaft P returns to its former position under the pressure of the two springs which have been referred to, allowing sudden depression of the hammer $O^2$ and at the same time returning fork $o^9$ to its position clear of the thread and guide-plate $o$. Having thus accomplished the function for which it was drawn to its inner position, the rock-shaft is immediately returned to its outer position by wing $E^3$ of the cam $E^2$ engaging with the inner cam-surface $p^5$ of tappet $P^2$, in which position it remains at rest until again drawn in at the next change of thread. It should be noticed that posts $o^{20}$ and $o^{14}$ are of sufficient length to maintain constant engagement, the former with finger $o^{19}$ on top of the hammer and the latter with cam-lever $o^{13}$ of the fork, irrespective of whether rock-shaft P is in its inner or outer position, these engagements never being released by either sliding or partial rotation of the rock-shaft. I will now proceed to describe the action of this thread-end-guide plate and its cutting mechanism in relation to the free or waste ends of the threads. This is threefold: First, it constantly holds the ends of all of the inactive threads under its thread-clips in proper position for the depression of one of the thread-changers to force its thread into thread-carrier $g^3$, and consequently throw it into the needles; secondly, when this has been done it severs the unused end of this thread close to the inside of the stocking-tube, and, thirdly, when the same thread is again thrown out of action it replaces it beneath the thread-clips and immediately severs it close to the inside of the stocking, leaving it in position to be thrown into action again at the proper time.

At the beginning of the knitting operation the loose ends of the four threads after passing through the eyes of the thread-changers, which must be assumed to be in their horizontal position, are passed under the thread-clips $o^5$, where they are firmly secured. This position of the thread is indicated by the dotted line, Fig. 11. In this position all parts with which the thread is in contact revolve coincidently and no change in its position can take place. As soon as one of the thread-changers is depressed its thread is carried down into thread-carrier $g^3$, assuming the position indicated by the broken line in Fig. 11. This causes the thread to pass between two of the needles near their heads, so that the further rotation of plate G around the fixed needle-cylinder lays the thread continuously around the ring formed by the open needle-heads, by which it is continuously knit, for which purpose it is continuously drawn off its bobbin. In the meantime the waste end of this thread—that is to say, the portion between the point of its insertion between two of the needles and the thread-clips $o^5$—will have been drawn by the first half-rotation of the thread and guide under the turned-up tip $o^2$ of the tongue to the end of the slot $o^3$, thus wrapping it once around the base of the tongue into the position indicated by the broken line of Fig. 14. At the end of this half-rotation the hammer $O^2$ will therefore be directly over this thread at a point very near its juncture with the stocking-tube. Any further movement of the thread is temporarily opposed by the stop $o^{18}$; but the movement of the lever $l$, which caused this thread to be fed to the needles, through the action of trigger N, drew rock-shaft P into its inner position. Referring to Fig. 1, it will be noticed that the radial position of the cam M' of cam-plate M relative to the axis or rotation of the machine is almost coincident with the cam $E^4$, so that a half-rotation of plate G after cam-arm $l^2$ has encountered cam M' has brought tappet $P^2$ into engagement with cam E', thus tripping the hammer $O^2$ just as the waste end of the thread we are considering has been brought beneath its end. The hammer, although blunt, is a much more effective means for cutting the taut thread than an ordinary shearing or cutting edge. A cutter will in time become blunt or loose, while the hammer is always effective. The waste end of the thread which is being knit having been thus freed, the further rotation of the machine continues the knitting operation of this thread without interference caused by any floating end or loop. The severed waste-thread ends gradually accumulate under the thread-clips until removed by the operator, being constantly driven farther to the right by the repeated sweep of the fork, which oscillates once to every blow of the hammer. Immediately the hammer has done its work in severing the waste end of the thread under consideration the rock-shaft P is withdrawn to its outer position by contact of its tappet $P^2$ with the wing of cam $E^2$, which occurs before the end of the succeeding half-rotation. Thereafter rotation proceeds and continuous knitting is accomplished without displacement of any of the parts under consideration until the time comes for a change of thread. This occurs when cam-plate M is set to encounter the cam-arm $l^2$ of another one of the levers $l$, which by its motion simultaneously raises the thread-changer of the first thread and depresses a second thread. As far as this second thread is concerned it takes precisely the same course as did the one we have described; but it is necessary to note the disposition of the first thread, which, although withdrawn from the action of the needles by the raising of its thread-changer, is still fast to the knitting. As plate G rotates, this thread is drawn out until at the end of a half-rotation it occupies nearly the position of the dotted line, Fig. 11, except that the end is attached to the work. In the course of reaching this position, which is also indicated by dotted lines on Fig. 14, this attached end is drawn beneath the upwardly-bent extremity of the long wire arm $o^5$ and by it is guided beneath the thread-clips until at the end of the half-rotation it is drawn taut immediately beneath the hammer, where it is severed by the same blow which releases the waste end of the succeeding thread from attachment with the knitting. This severance takes place near the knit tube and, it will be observed, results in leaving the end of this thread where it was severed beneath the thread-clips in precisely the position of the other unused inoperative threads and ready to be again brought into play at the proper time.

In order to insure the certain action of the hammer, it is important that the thread be taut beneath it. So far as the thread which is going out of action is concerned, this is insured by the tension of the take-ups; but for the waste end of the thread going into action, which is wrapped around the base of the tongue, as indicated by the broken line, Fig. 14, it is necessary that the breadth of the base of the tongue shall precisely correspond to the length of this amount of thread. This may be properly adjusted by moving plate $o^{23}$ back or forth a short distance.

It will be understood that the ends of the idle threads remain secured under the thread-clips $o^5$ along with the more or less great accumulation of waste ends, which are constantly pressed toward the plate $o^4$ by the motion of the fork $o^9$. This motion, however, does not destroy the proper holding of the ends of the idle threads, because of the limit set to its motion by the stop $o^{11}$.

V. *The Cam-Plate Which Actuates the Levers and Its Reciprocating Mechanism.*

This, together with the pattern-wheel to be described, is the mechanism by which the height of cam-plate M may be varied with each rotation of the knitting-machine, and thereby the succession of the multiple knitting-threads varied in accordance with any predetermined pattern.

In the journal-flanges $B^5$ of table B is journaled the rock-shaft $B^6$, which is oscillated by a lever-arm $B^7$, set on its right-hand end, to which arm is pivoted the extremity of an eccentric-rod $B^8$, carrying a strap which surrounds an eccentric $c^3$, situated on the main shaft C, Figs. 2, 4, and 22. The lever-arm $B^7$ extends beyond the pivot of the eccentric-rod and is pivoted to a link $B^9$, the other end of which is pivoted to one corner of the swinging end of the irregular flat rocking lever $B^{10}$. (Best seen in Fig. 4.) The rear edge of this lever has depending lugs in which is set its transverse pivot-shaft $B^{11}$, rocking in journal-boxes in the ribs $B^2$ near the rear of the table B. The forward or swinging end of lever $B^{10}$ is expanded laterally and carries a transverse pivot-rod which to the right forms the pivot for attachment of link $B^9$, while to the left it is turned up on the median line of the machine to form the vertical reciprocating slide-rod $b$. (See Fig. 7.) The upper end of slide-rod $b$ terminates in slide-block $b'$. Immediately in front of slide-rod $b$ is a vertical guide-rod $b^2$, encircled by block $b'$, which runs vertically on it, contacting at the upper end of its reciprocation, with interposition of the coiled cushion-spring $b^3$, with a horizontal plate $m$, fast on the top of guide-rod $b^2$, and at the lower end of its reciprocation, with interposition of the coiled cushion-spring $b^4$, with a shoulder-block $b^5$, set adjustably on guide-rod $b^2$. To the top of plate $m$ is screwed the cam-plate M, the vertical position of which determines the actuation of levers $l$. With each rotation of eccentric $c^3$, and therefore once for each rotation of the cam-cylinder of the knitting-machine, the rocking lever $B^{10}$ is moved up and down, reciprocating slide-rod $b$, and with it block $b'$, vertically. At the upper end of its traverse, block $b'$ raises plate $m$, and therefore cam-plate M, to a height which is substantially fixed, as coiled spring $b^3$ is too short to afford much play. At the lower end of its traverse it depresses cam-plate M as far as it is permitted to go, the rest of the downward movement being taken up by coiled spring $b^4$. The extent of the depression of cam-plate M at each reciprocation is limited by the contact of a depending vertical post $m'$ with a flattened lower end set adjustably in the lower side of plate $m$ with the peripheral pattern-jacks of a pattern-wheel Q, to be described later on. The cam-cylinder of the knitting-machine is geared to the main shaft in such relation to eccentric $c^3$ that when the machine is in the initial position of the drawings, in which the further rotation of plate G is about to bring the cam-arms of levers $l$ in position to be acted on by the cam edge of cam-plate M, (see Fig. 1,) the eccentric has almost reached the end of its traverse and is about to depress slide-rod $b$ to its utmost extent, (see Fig. 2,) so that at the moment of contact of lever $l$ with cam-plate M the latter will be held down under the tension of spring $b^4$ to the utmost extent allowed by that one of the peripheral pattern-jacks of the pattern-wheel Q which at the time is beneath post $m'$.

VI. *The Pattern-Wheel and Its Pawling Mechanism.*

Pattern-wheel Q is a large metal wheel mounted horizontally on the large upright post Q', which rises centrally from table B. Above it there is set upon post Q' a triangular plate $Q^2$, pierced by adjustable tension-screws $Q^3$, which abut against a tension-plate $Q^4$, the lower side of which is furnished with yielding disks $Q^5$, which the screws $Q^3$ press sufficiently against the upper side of wheel Q to steady its motion. The front edge of plate $Q^2$ is forked, throwing forward two arms with depending sleeves $Q^6$, within which run vertical rods $m^2$ $m^2$, fixed to the under side of plate $m$, the strictly vertical reciprocation of which in fixed relation to the center of the pattern-wheel is thereby secured.

The periphery of the pattern-wheel is cut by a large number of radial slots, reaching nearly to the lower edge of the periphery, in which are set pattern-jacks, as seen in Fig. 7. The radial outlines of the slots are there indicated at $q^6$, while the shape of the six varieties of pattern-jacks are shown in Fig. 19, (indicated, respectively, as $q$ $q'$ $q^2$ $q^3$ $q^4$ $q^5$.) The first five forms of jacks each have a projecting step or shoulder at a different height on the jack. In jack $q$ the step is level with the top of the jack. In jacks $q'$ $q^2$ $q^3$ $q^4$ it is successively lower down. In jack $q^5$ the step is altogether wanting. When the jacks are set in place in their slots, they entirely fill them, with only their steps projecting. They are retained in their slots by a split ring $q^7$, surrounding the wheel and resting on a flange formed by a series of little lugs $q^8$, projecting uniformly from the walls between the slots. Below this ring each of the walls between the slots is slightly cut away, as indicated by the dotted line $q^9$, Fig. 7, as a consequence of which the bases of the pattern-jacks when set in place form a rack, converting this part of the wheel into a ratchet-wheel.

The distance of the post $m'$ from the center of the pattern-wheel is such that its flattened lower end, which is presented radially toward the wheel, strikes as it falls the step of any jack which is set in the slot of wheel Q which is nearest to it. Jack $q$ therefore checks its descent on a level with the upper edge of the periphery of the wheel Q. Jacks $q'$ to $q^4$ each allow it to descend successively lower, while jack $q^5$, having no step at all, allows it to descend past the wheel toward a short vertical post $q^{10}$, set in the table directly beneath post $m'$. This post $q^{10}$ serves as a support for the periphery of the wheel Q against the constant blows it receives from post $m'$ as it descends with each reciprocation of slide-rod $b$. When jack $q$ is beneath post $m'$, cam-plate M is held from descending low enough for its cam edge to actuate any of the levers $l$. Jack $q'$ allows it to descend to the level of the top one of the four levers, $q^2$ to the second, $q^3$ to the third, and $q^4$ to the fourth, while $q^5$ allows it to descend below the level of all of the levers $l$. It will therefore be seen that by filling the slots of the pattern-wheel Q with jacks in the proper order of succession the pattern according to which the changing of the threads of the knitting is to be effected is made. For every rotation of the machine in which a change of thread is to be made the corresponding jack is set in the proper slot of the wheel, while the intermediate slots are filled with jacks $q$, which prevent any change of the thread.

It remains to describe the pawling mechanism (see Figs. 4 and 5) by which the slots of wheel Q, with their jacks, are advanced under post $m'$ in continuous succession, one slot to each rotation of the machine.

R is a horizontal pawling-lever pivoted to the top of table B on screw-post R' to the left of post Q'. On top of this lever, near its swinging extremity, rises an upright sleeve $R^2$, in which rotates freely a vertical post $r$. The upper projecting extremity of this post has a pawl $r'$ set transversely through it by set-screw $r^2$, the swinging extremity of the pawl playing upon the ratchet-wheel formed on pattern-wheel Q by the bases of the pattern-jacks, as has been explained. The pawl is kept pressed against the ratchet-wheel by the tension of a coiled spring $r^3$, surrounding sleeve $R^2$ and made fast to it at one end, while its other end embraces the pawl. The length of the pawl is such that the pawling action takes place immediately below post $m'$. The accidental omission of a jack stops the motion of the pattern-wheel.

Lever R has a projecting arm $R^3$, to the end of which a coiled spring $r^4$ is attached, the other end of the spring being fast to post $q^{10}$. This spring by its tension constantly pulls lever R to the left until it is stopped by the depending lug $r^5$ abutting against the end of an adjustable screw $r^6$, set through the left-hand rib $B^2$ on the top of the table.

The oscillation of lever R, whereby the pawling motion is effected, is imparted to it by a swinging cam-roller $s$, which intermittently comes into contact with an inclined cam-surface $r^7$ on the left-hand side of the forward end of lever R. By this contact the lever is thrown to the right in opposition to coiled spring $r^4$ a sufficient distance to advance the pattern-wheel to the extent of one slot. This cam-roller $s$ is mounted on the end of a rocking arm S, made fast by set-screw $s^2$ to the left-hand projecting extremity of rock-shaft $B^6$. As this shaft rocks under the action of the eccentric $c^3$ once for each rotation of the machine, cam-roller $s$ oscillates lever R, so as to advance the pattern-wheel to the extent of one slot for each rotation of the knitting-cylinder.

The parts which have thus far been described are all that are necessary for the continuous production of a knit tube with change of thread at predetermined intervals, according to the position of the jacks of the pattern-wheel, and as long as the driving-belt leads to pulley $c$ the actions of the parts which have been described will continue without interruption—that is to say, the rotation of the knitting-cylinder will cause the needles to knit a continuous tube, while the action of the thread-changers will vary the thread, so as to produce a striped effect, according to the varying heights at which cam-plate M is held, depending upon the arrangement of the pattern-jacks in the pattern-wheel. For the production of such a striped tube it is therefore only necessary to cause the four bobbins $h^2$ to carry threads of different colors and to so insert the jacks as to cause them to effect the changes at the proper intervals. The pattern on the pattern-wheel may thus be caused to repeat itself indefinitely. As, however, the stocking-knitter which I am now describing is one which at proper intervals ceases its motion of rotation and substitutes therefor a motion of oscillation, which forms pockets in the tube which subsequently become the heel and toe pockets of the stocking made therefrom, and as it is usually desirable that these heel and toe pockets should be of a single color, I have provided means whereby during this oscillatory motion the necessary motion of the pattern-wheel and the parts connected with it is intermitted. Furthermore, as the nature of the pattern to be produced must always bear a fixed relation to the length of the stocking it is convenient to have the pattern-wheel itself determine the point at which the motion of rotation shall cease, and I have accordingly provided the machine which I am describing with connections whereby this is automatically accomplished. To understand these connections, it is necessay first to describe the parts of my machine by which this change from motion of rotation to motion of oscillation is effected, including the pattern-chain by which the length of the oscillatory period is determined.

The particular mechanism which I am about to describe makes it possible to cause the machine to operate as one commonly known in the trade as "seven-eighths automatic"—that is to say, one in which the change of motion from oscillation to rotation is automatically effected, so that the interposition of the operator is only necessary in order to effect the reverse change from rotation to oscillation. At the same time the machine is so constructed that it may, if desired, be used in such a way as to compel the operator to intervene also at the other change—that is, the change from oscillation to rotation—thus working as what is known as a "three-quarters automatic" machine. I will now proceed to describe the mechanism for effecting these changes.

VII. *The Mechanism for Changing Rotation to Oscillation.*

*a. The oscillating mechanism.*—I have previously stated that with certain connections the shifting of the belt from pulley $c$ to pulley $v$ effects the oscillation of the main shaft. The connections whereby this is accomplished are as follows: To the right of pulley $v$ and integral with it is a pinion V, which gears with a pinion V', which is fast on an auxiliary shaft journaled in casting $A^4$, which carries on its right-hand end pinion $V^2$, which gears with the gear-wheel $V^3$. (These connections are best seen in Figs. 2 and 4.) The latter wheel carries a boss $v'$, which engages the slot of a slotted carrier $v^2$, made fast to a sliding rack $v^3$. This rack reciprocates between rollers $v^4$, engaging with pinion $v^5$, which runs freely upon the main shaft C near its right-hand end. By the action of these parts rotation of pulley $v$ causes continuous oscillation of pinion $v^5$. The casting $A^4$, by which the parts just referred to are supported, is sufficiently indicated in the drawings, Figs. 1, 2, and 4. Reference should, however, be made to the projecting piece $A^{10}$, which serves as a guard to protect the rack during the forward part of its traverse. In order that the oscillation of pinion $v^5$, which results from shifting the belt to pulley $v$, may be communicated to the main shaft, it is necessary that the former be made fast to the latter, which connection is accomplished by a clutch which is thrown by the hand-lever X. Until this latter lever is thrown pulley $v$ is virtually an idle pulley and cannot effect oscillation of the cam-cylinder. There is, however, the further peculiarity about this connection that means must be provided which will forbid its being made while the belt is on pulley $c$, as to then establish the connection would lock the machine. To this effect I employ an automatic one-way clutch, which I will now describe.

*b. Automatic clutch and clutch-lever.*—The elements of the clutch are shown in Figs. 22, 23, and 24. A clutch-box Z surrounds an expanded portion of the main shaft, being keyed to it by a spline $z$, which allows the box Z to be shifted toward or away from the counterpart box which is formed in the pinion $v^5$.

The clutch element of box Z is an axially-projecting broken annular collar $z'$, Fig. 23, the broken ends presenting the one a straight and the other a concave edge. The clutch element of the counterpart consists of the annular groove $v^6$, formed in the opposing face of pinion $v^5$. This groove is interrupted by a pin $v^8$, fixed within it, but not projecting beyond its edge. A small ring carrying a projecting web $v^7$ is free upon the shaft within this groove. If web and pin are in contact, their combined thickness equals the break of the annular collar $z'$, the curved side of the pin fitting into the concave break of the collar, and consequently the collar is free to enter the groove $v^6$, coupling Z and $v^5$ together; but when uncoupled the forward revolution of the main shaft or the rotation of pinion $v^5$ in the direction against the arrow of Fig. 24, which results from a backward movement of rack $v^3$, causes web and pin to separate, in which position they occupy too much space to allow the clutch to couple. On the other hand, a reverse movement of the rack immediately brings the pin into contact with the web, making it possible by throwing the clutch-box Z to couple the clutch. From this it results that it is only during oscillation of pinion $v^5$, and then not until a forward movement of the rack has begun, that coupling can be effected.

The movement of the clutch is effected by the engagement in a groove of box Z of a forked arm $z^2$, set upon rock-shaft $x$, which is journaled longitudinally upon plates $A^4$ and $A^5$, and carries fast to its forward end the hand-lever X, by which the clutch is thrown. This lever (see Figs. 6 and 20) carries a pivoted notched arm $x'$, depressed by spring $x^2$, so that the notches engage a forwardly-projecting post $x^3$, set in plate $A^5$. When lever X is thrown so that the nearest notch is in engagement with post $x^3$, the clutch is uncoupled and oscillation of the cam-cylinder ceases. When it is thrown to the other notch, the clutch is coupled as soon as the oscillating mechanism begins its first forward movement.

*c. Pattern-chain and its pawling mechanism.*—The function of this pattern-chain is to limit the period of oscillation, so as to produce the proper number of stitches to produce a pocket, bringing this period to an end by automatically uncoupling the clutch when the proper time comes.

Upon post $x^3$ in front of plate $A^5$ is pivoted a sprocket-wheel T, around which runs a pattern-chain $t$, which has a high link $t'$, which when it comes to the top of the sprocket-wheel contacts with a beveled shoe $x^8$ (see Fig. 20) on the extremity of a lateral arm $x^4$, projecting from the upper extremity of hand-lever X. During the motion of oscillation this sprocket-wheel and its pattern-chain are advanced one link for each oscillation of the machine by the following pawling mechanism: $y$ (see Fig. 21) is a short rock-shaft journaled in plate $A^5$, carrying on its rear end an arm $y'$, with a conical roller $y^2$ mounted on its projecting end. The forward end of this rock-shaft carries a bell-crank lever $y^3$, to the lower end of the vertical arm of which is pivoted a pawl $y^4$, the point of which is maintained in engagement with a ratchet-wheel Y by the tension of spring $y^5$. This ratchet-wheel is made fast to the back of sprocket-wheel T, the connection being adjustable by means of screws passing through circumferential slots in the sprocket-wheel. A trigger-arm $y^6$ is pivoted in front of the plate $A^5$ and in such position that when vertical its lower end engages the extremity of the horizontal arm of bell-crank lever $y^3$. This trigger-arm is maintained in its vertical position by pressure of spring $y^7$. Hand-lever X is fitted near its pivotal center with a boss which carries a small inwardly-projecting pin $x^7$. When hand-lever X is thrown from the position indicated in the drawings to its right-hand position to couple the clutch, this pin $x^7$ presses the trigger-arm against pressure of spring $y^7$ out of engagement with the arm of bell-crank lever $y^3$. Thus freed the tension of spring $y^5$ rotates bell-crank lever $y^3$ and raises the conical roller $y^2$ far enough to bring it into the pathway of the reciprocating rack $v^3$. The forward end of this rack has an inclined edge which contacts with and depresses this conical roller once for each reciprocation of the rack. This depression drives the pawl $y^4$ far enough forward against the tension of spring $y^5$ to advance ratchet-wheel Y, and therefore sprocket-wheel T, the space of one tooth, which is equal in length to one link of the pattern-chain. By the coaction of these parts when lever X is thrown to couple the clutch and start the motion of rotation this pawling mechanism comes into operation and causes reciprocation of the machine to advance the pattern-chain one link for each reciprocation. The pattern-chain contains as many links as it is desired there shall be reciprocations of the machine, and at the end of its circuit high link $t'$ coming into contact with shoe $x^8$ of lever X shifts it into its other position, automatically uncoupling the clutch and causing the motion of oscillation to cease. High link $t'$ remains at rest in this position, its contact with the shoe forbidding accidental displacement of the hand-lever X during the entire period of rotation. When, however, rotation has come to an end and the belt has been shifted from pulley $c$ to pulley $v$ and it is again desired to throw hand-lever X so as to recommence a period of oscillation, the operator manually draws the chain $t$ forward a short distance, so as to withdraw high link $t'$ from contact with shoe $x^8$. In order that the extent of this forward movement of the chain shall be uniform and always leave the proper remainder of the chain to measure the oscillatory period, the latter is furnished with a wide link $t^2$, (the second link behind high link $t'$,) which comes in contact with a lug $x^6$ on the end of another fixed arm $x^5$, carried by hand-lever X. The forward motion of this chain is therefore checked by this contact until hand-lever X has been thrown coupling the clutch, by which motion lug $x^6$ is depressed, so that wide link $t^2$ is free to pass.

*d. Belt-shifting mechanism.*—U is a belt-shifter which has a pivot U' at its upper end by which it is hung to the back of plate $A^5$, while its lower end carries a belt-yoke, which when the belt-shifter is moved throws the driving-belt from pulley $c$ to pulley $v$. A journaling-lug $U^2$ projects from the left face of plate $A^6$ and affords pivotal support for a hand-lever W. (See Figs. 3 and 6.) In Fig. 6 the lower end of this lever is broken off. Its upper end above its pivot is fitted with a pin $w$ with an expanded head, which is received within an end slot in a link $w'$. The other end of this link is pivoted to the lower end of belt-shifter U. By this connection when the hand-lever W is thrown to the horizontal the belt is thrown to pulley $v$, while when it is thrown to the vertical—the position of the drawings—the belt returns to pulley $c$. This movement is positive as far as the change from vertical to horizontal is concerned, so that whenever during rotation of the machine the lever is pulled to the horizontal the belt is shifted to pulley $c$, and rotation must cease. The reverse movement is, however, not positive by reason of the slotted connection of link $w'$ with pin $w$, which if the belt-shifter is otherwise detained beneath the pulley $v$ allows the lever to be depressed without moving the shifter, the pin $w$ moving toward the end of the slot in the link against the tension of a coiled spring $w^2$, which is fast at one end to link $w'$, near its pivotal connection with the belt-shifter, and at the other end to an arm formed on the upper end of hand-lever W, the latter point of attachment being so placed as to allow the end of link $w'$ to pass under the spring as the lever is shifted. This method of connection is taken advantage of to prevent the accidental throwing of the lever from the horizontal to the vertical while a pocket is in course of formation, which would start rotation prematurely and spoil the pocket. This is prevented by the following mechanism: $U^3$ is another journal-lug formed on plate $A^6$. It affords pivotal support to a lever-arm $t^3$, which, reaching to the right immediately behind the top of the arms of hand-lever X, is brought within the play of high link $t'$ of the pattern-chain, being raised by it when this link is at the top of the sprocket-wheel. A wire link $t^4$ connects lever-arm $t^3$ with a pivoted trigger-arm $t^5$, which is pivoted immediately alongside of hand-lever W, extending horizontally to the right, so that its blunt free end when it is in its lower position comes into contact with the pivotal connection between link $w'$ and belt-shifter U should it be attempted to shift the belt-shifter from right to left. While rotation is proceeding, high link $t'$ maintains lever-arm $t^3$ in its upper position, so that trigger-arm $t^5$ is out of interference with the belt-shifting lever as long as these parts remain in this position—that is, during the entire period of rotation. As soon, however, as high link $t'$ is advanced preparatory to beginning a period of oscillation the fall of lever-arm $t^3$ depresses trigger-arm $t^5$, so as to effectually block the return of the belt-shifter from right to left, the depression of hand-lever W at any time during the period of rotation causing spring $w^2$ merely to yield, allowing pin $w$ to pass toward the end of the slot of link $w'$, which tension remains until the completion of the period of oscillation brings high link $t'$ again into contact with lever-arm $t^3$, raising it, when immediately the tension-spring $w^2$ exerts itself to throw the belt-shifter and recommence rotation.

By the proper manipulation of the hand-levers W and X the succession of operations of the knitting-machine may be entirely controlled as follows: The parts being in the position of the drawings, continuous knitting proceeds. If at any time it is desired to stop the knitting temporarily for adjustment of the parts, hand-lever W is raised, shifting the belt to pulley $v$, which is an idle pulley unless the clutch is shifted, since the parts which it actuates perform in themselves no function. When it is desired that the continuous knitting shall come to an end and a pocket be inserted, lever W is raised, stopping rotation, the sprocket-chain is drawn forward one link, and lever X thrown to couple the clutch, whereupon oscillation proceeds. After coupling the clutch oscillation proceeds for the length limited by the pattern-chain. The pattern-chain may also be employed for the purpose of actuating the mechanism which shifts the pickers and causes the change from narrowing to widening during the fashioning operation; but this forms no part of my present invention. During all this time of oscillation accidental premature shifting of the belt to bring it to an end is forbidden by the descent of the trigger $t$, which has locked the belt shifter. Hand-lever W, it is true, may be thrown, and in case it is desired to use the machine as a seven-eighths automatic it should be thrown immediately after the shifting of the clutch; but this has no effect upon the operation of the machine until the end of the period of oscillation, when the commencement of rotation will begin automatically by the high link itself shifting the clutch, raising the trigger, and allowing the belt-shifter to be pulled to the left; but if it is intended that the machine shall be used as a three-quarters automatic, lever W remains raised after the clutch has been coupled, in which case at the end of the period of oscillation the clutch is uncoupled automatically, but the belt remains upon pulley $v$ as an idle pulley until the operator depresses hand-lever W, starting rotation. It now remains to describe the connections between these parts for changing the motion of the machine and the change-thread mechanism.

VIII. *Connections Whereby the Pattern-Wheel Determines the Length of the Period of Rotation and Brings the Machine to a Standstill After the Pattern of the Striping has been Completed.*

Among the pattern-jacks one of them, $q^5$, has been described as having no projecting step. This jack is only inserted in the slots of the pattern-wheel at the point where the knitting of the striped tube of the stocking is desired to come to an end. When the rotation of the pattern-wheel brings this jack $q^5$ beneath the post $m'$, the latter is free to descend toward the supporting-post $q^{10}$. On the extreme lower end of the vertical rod $b^2$, which has been heretofore described, is mounted a hook $b^6$, which when depressed to the depth which is only permitted by the presence of the jack $q^5$ in the pattern-chain engages a pin $W^2$ on the lever-arm $W^3$, fast to a rock-shaft $W'$, which is journaled in $B^4$ and $U^2$ and constitutes the pivot of hand-lever W. The engagement of the hook with the pin enables the immediately-succeeding elevation of slide-rod $b^2$ to partially rotate rock-shaft $W'$ far enough to allow its further revolution to the extent of almost half a rotation under the influence of a spring $W^4$, coiled on rod $W^5$, mounted between the upright arms of the yoked standard $B^4$. This coiled spring drives a collar $W^6$, to which is pivoted the S-shaped link $W^7$, the other extremity of which is pivoted to an arm $W^8$ on rock-shaft $W'$, the spring coming into operation as soon as this latter pivot has been carried past its dead-point by the pull of the hook. The partial rotation of the rock-shaft thus produced throws the lever W to the horizontal, shifting the belt and stopping the machine.

The subsequent lowering of hand-lever W by hand, whether it be done immediately after coupling the clutch or at the end of the period of oscillation, resets coiled spring $W^4$ on rod $W^5$ in position to again throw the lever when hook $b^6$ again descends at the end of a succeeding period of rotation.

IX. *Connections Whereby the Pawling of the Pattern-Wheel Ceases During Oscillation.*

I have previously described (VI) the pawling of the pattern-wheel produced by contact of cam-roller $s$ on the end of rocking arm S with a cam-surface on the forward end of lever R. In order to stop this pawling motion during oscillation, this contact is then prevented, as follows: Arm S has the form of a slotted sleeve, (see Fig. 3,) within which slides a post $s'$, carrying cam-roller $s$ on its projecting extremity. The projection of this post is opposed by a coiled spring $s^3$ within the slot of the arm abutting against a collar $s^4$, set on the post, and is effected against the tension of this spring by a beveled slide-pin $s^5$, set horizontally in a collar S', which is free upon the projecting end of rock-shaft $B^6$, the projecting beveled end of this pin entering a hole near the base of arm S when the bevel of pin $s^5$ meets the end of post $s'$ and when inserted in to its full extent (until collar S' touches arm S) projects post $s'$, as seen in Fig. 12, in which position cam-roller $s$ with each oscillation of rock-shaft $B^6$ contacts with cam-surface $r^7$ of lever R.

Collar S' is held throughout the operation of continuous knitting in juxtaposition with arm S (and therefore with pin $s^5$, projecting post $s'$) by the tension of a coiled spring $S^2$, one end of which is fast to a boss $s^6$, projecting from collar S', while its other end is fast to the extremity of an L-shaped lever-arm $T^2$ on the longitudinal rock-shaft T', which is journaled in the right-hand bifurcation of standard $B^4$, and also in journal-lug $U^3$ in plate $A^6$, where it constitutes the pivot of lever-arm $t^3$, the extremity of which is raised during the entire operation of continuous knitting by high link $t'$, as has previously been explained. In this position rock-shaft T' is held with arm $T^2$ vertical, in which position pawling of pattern-wheel Q is continuous by reason of the connections which have been described; but the removal of high link $t'$ from its position under the extremity of lever-arm $t^3$, which is the preparatory step previous to shifting hand-lever X to commence oscillation, stops any further revolution of the pattern-wheel Q by reason of the tension of the spring $T^3$, (one end of which is fast to one of the flanges $B^5$, while its other end is fast to the end of lever-arm $T^2$,) and which therefore immediately throws rock-shaft T' into a position with its arm $T^2$ to the left of the vertical. Coiled spring $S^2$ incloses a rod $T^4$, which abuts at one end against the extremity of lever-arm $T^2$ and at the other against boss $s^6$ on collar S'. The swinging of arm $T^2$ under the tension of spring $T^3$ has by this means pushed collar S' far enough away from arm S to withdraw pin $s^5$ from its position beneath projecting post $s'$, allowing the latter to fall in arm S, in which retracted position it fails to engage the cam-surface of pawling-lever R and pawling ceases until high link $t'$ again raises lever-arm $t^3$ at the end of the oscillatory period.

By the combined coöperation of all the parts of the machine which I have described the knitting of a striped stocking proceeds as follows: Pattern-wheel Q (see Fig. 1) contains a blank space free from radial slots, which is the point of beginning the operation. Initially this space is set by hand immediately above post $q^{10}$. In the drawing the leg is half knit, and this space has moved halfway to the right. The knitting of the leg of the stocking and its striping under the action of the change-thread mechanism proceeds according to the set pattern until the first jack $q^5$ is reached, which in the drawing is at the left-hand side and which stops rotation. Here the operator intervenes and by throwing the clutch sets up an oscillatory period, which inserts the heel-pocket. At the end of this period rotation automatically recommences with renewed movement of the pattern-wheel, so that the foot of the stocking is striped in accordance with the pattern set upon the rear half of the wheel as it appears in Fig. 1 until the second jack $q^5$ is reached, when the toe-pocket is inserted.

Having thus described my invention, I claim —

1. In a circular-knitting machine having means for utilizing a plurality of threads and a single thread-carrier, the combination of the following group of mechanism: mechanism whereby any one of the threads may be introduced into the thread-carrier; mechanism whereby the thread previously in the thread-carrier is withdrawn therefrom; mechanism whereby the successive introduction of the threads is accomplished in accordance with a predetermined pattern; and mechanism whereby upon the introduction of a thread its free or waste end is severed from the knitting, substantially as described.

2. In a circular-knitting machine having means for utilizing a plurality of threads and a single thread-carrier, the combination of the following groups of mechanism; mechanism whereby any one of the threads may be introduced into the thread-carrier; mechanism whereby the thread previously in the thread-carrier is withdrawn therefrom; mechanism whereby the successive introduction of the threads is accomplished in accordance with a predetermined pattern; mechanism whereby upon the introduction of a thread its free or waste end is severed from the knitting; mechanism whereby upon the withdrawal of a thread it is severed from the knitting; and mechanism whereby the ends of the threads which are not knitting are held taut and ready for use, substantially as described.

3. In a circular-knitting machine, the combination of a stationary needle-cylinder; a rotating cam-cylinder; a single V-shaped thread-carrier rotating with the cam-cylinder; thread-changers also rotating with the cam-cylinder of which a plurality are mounted to one side of the center line of the thread-carrier, and a similar plurality to the other side of said line; and means whereby the successive depression of the thread-changers successively introduces their threads into the thread-carrier, substantially as described.

4. In a circular-knitting machine having means for utilizing a plurality of threads and a single thread-carrier, the combination of the following groups of mechanism: mechanism whereby any one of the threads may be introduced into the thread-carrier; mechanism whereby the thread previously in the thread-carrier is withdrawn therefrom; mechanism whereby the successive introduction of the threads is accomplished in accordance with a predetermined pattern; mechanism whereby upon the introduction of a thread its free or waste end is severed from the knitting; mechanism whereby upon the withdrawal of a thread it is severed from the knitting; mechanism whereby reciprocatory motion is established between the knitting-cylinders; and mechanism whereby upon establishing reciprocatory motion between the cylinders the mechanism for changing the thread is rendered inoperative, substantially as described.

5. In a circular-knitting machine having means for utilizing a plurality of threads and a single thread-carrier, the combination of the following groups of mechanism: mechanism whereby any one of the threads may be introduced into the thread-carrier; mechanism whereby the thread previously in the thread-carrier is withdrawn therefrom; mechanism whereby the successive introduction of the threads is accomplished in accordance with a predetermined pattern; mechanism whereby upon the introduction of a thread its free or waste end is severed from the knitting; mechanism whereby upon the withdrawal of a thread it is severed from the knitting; mechanism whereby reciprocatory motion is established between the knitting-cylinders; mechanism whereby upon establishing reciprocatory motion between the cylinders the mechanism for changing the thread is rendered inoperative; mechanism for predetermining the length of the reciprocatory period; mechanism whereby at the end of the reciprocatory period rotary motion is automaticatically reestablished; and mechanism whereby upon the reestablishment of rotary motion the change-thread mechanism is automatically rendered operative, substantially as described.

6. In a circular-knitting machine, the combination of a fixed needle-cylinder; a rotating cam-cylinder carrying a thread-guide; mechanism rotating with said cam-cylinder for successively inserting one or other of a plurality of threads into said thread-guide; mechanism whereby the thread thus inserted is changed according to a predetermined pattern; and mechanism whereby the free or waste end of the thread thus introduced is carried by the rotation of the cam-cylinder, into contact with severing mechanism whereby, before the completion of the first complete revolution after the introduction of the thread, said free or waste end is severed in immediate proximity to the knitting, substantially as described.

7. In a circular-knitting machine, the combination of a fixed needle-cylinder; a rotating cam-cylinder carrying a thread-guide; mechanism rotating with said cam-cylinder for successively inserting one or other of a plurality of threads into said thread-guide; mechanism whereby the thread thus inserted is changed according to a predetermined pattern; and mechanism whereby the free or waste end of the thread thus introduced, and simultaneously the thread which has been withdrawn from the knitting, are carried by the rotation of the cam-cylinder into contact with severing mechanism which, before the completion of the next revolution after the introduction of the thread, severs both threads in immediate proximity to the knitting, substantially as described.

8. In a circular-knitting machine, the combination of a stationary needle-cylinder; a rotating cam-cylinder; a single thread-carrier rotating with the cam-cylinder; guiding devices for a plurality of threads rotating with the cam-cylinder; a clamping device by which the ends of all these threads are held within the needle-cylinder also rotating with the cam-cylinder; and mechanism whereby the thread which is being fed to the needles through the thread-carrier may be removed therefrom and clamped at its end with the other threads; and mechanism whereby immediately before such removal another thread is laid in the thread-carrier and fed to the needles, substantially as described.

9. In a circular-knitting machine, in combination with the knitting-cylinders, an independent rotating horizontal annular plate external to the cylindrical surface defined by the needles mounted above and concentrically with the said cylinders; means whereby said plate may be connected with the cam-cylinder and caused to rotate coincidently therewith; and thread-changing apparatus mounted on said plate, substantially as described.

10. In a circular-knitting machine, in combination with the needle and cam-cylinders, an annular rotating horizontal plate external to the cylindrical surface defined by the needles mounted above and concentrically with the said cylinders; means whereby said plate may be connected with the cam-cylinder and caused to revolve coincidently therewith; and thread-bobbins and thread-changing apparatus mounted on said plate, substantially as described.

11. In a circular-knitting machine, in combination with the needle and cam-cylinders, an annular rotating horizontal plate external to the cylindrical surface defined by the needles mounted above and concentrically with the said cylinders; means whereby said plate is caused to revolve coincidently with the cam-cylinder; thread-changing apparatus mounted on said plate; and means whereby said plate may be swung away from and back to its position of axial coincidence with the knitting-cylinders, substantially as described.

12. In a circular-knitting machine, the combination of the knitting-cylinders; a swinging table pivotally mounted at one side of the cylinders; a horizontal annular plate external to the cylindrical surface defined by the needles carried by said swinging table; means whereby said table may be locked in position with the plate over the knitting-cylinders and axially concentric therewith; means whereby said plate may be caused to rotate coincidently with the cam-cylinder; and thread-changing mechanism mounted upon said table, substantially as described.

13. In a circular-knitting machine, the combination of the knitting-cylinders; a swinging table mounted on a pivot revolving in an upright sleeve fixed to one side of the knitting-cylinder; means for raising and lowering said pivot along with the table which it carries; a fixed vertical guide-rod which prevents the table from swinging upon its pivot until the latter has been raised above its upper end; a rotating plate carried by said table; means whereby said table may be locked in position with the plate over the knitting-cylinders and axially concentric therewith; means whereby said plate is caused to rotate coincidently with the cam-cylinder; and thread-changing mechanism mounted upon said plate, substantially as described.

14. In a circular-knitting machine, the combination of the knitting-cylinders; a rotatable annular plate suspended above said cylinders and axially concentric therewith; thread-changing mechanism mounted on said plate; a vertical sleeve carried by the cam-cylinder; a spring-projected pin within said sleeve; and an aperture in the rotating plate which is engaged by the pin when projected, whereby coincident rotation of the cam-cylinder and the plate is secured, substantially as described.

15. In a circular-knitting machine, the combination of the knitting-cylinders; an annular swinging table pivoted to the bed-plate of the machine at one side of the knitting-cylinders and swinging in a plane above them; locking mechanism whereby said table may be retained in a position of axial coincidence with the knitting-cylinders; a rotating annular plate external to the cylindrical surface defined by the needles mounted concentrically upon the horizontal annular table; and thread-changing mechanism mounted upon said rotating plate, substantially as described.

16. In a circular-knitting machine, the combination of a fixed needle-cylinder; a rotating cam-cylinder; a fixed plate mounted above the cylinders and having a circular aperture and annular groove concentric therewith; an annular horizontal plate external to the cylindrical surface defined by the needles, the periphery of which rests and rotates within said annular groove, said rotating plate being connected so as to revolve with the cam-cylinder; and thread carrying and feeding mechanism mounted on said rotating plate, substantially as described.

17. In a circular-knitting machine, the combination of the knitting-cylinders, and a swinging table mounted on a pivot revolving in a sleeve fixed at one side of the cylinders; mechanism for raising and lowering the pivot; and a fixed vertical guide-rod whereby the table is prevented from swinging on its pivot until it has been raised above the upper end of the rod, substantially as described.

18. In a circular-knitting machine, the combination of the knitting-cylinders; a rotating plate suspended above and axially concentric with said cylinders; and a spring-projected pin within a sleeve carried by the cam-cylinder, whereby engagement is had with an aperture in the rotating plate suspended above it, substantially as described.

19. In a circular-knitting machine, the combination of the knitting-cylinders; a single thread-carrier with a V-shaped guide above it leading to it; a plurality of thread-changing levers pivoted in parallel relation to each other upon a common horizontal pivot which is fixed in its relation to the thread-carrier; in combination with means whereby the thread-changing levers are successively depressed and raised, whereby by the aid of the thread-guide they successively introduce and remove their thread to and from the thread-carrier, substantially as described.

20. In a circular-knitting machine, the combination of a cam-cylinder having, in fixed relation to itself, a single thread-carrier which forms the apex of a V-shaped expanded opening; three or more thread-changing levers horizontally pivoted so as to move vertically in parallel relation to each other, and in such relation to the expanded opening of the thread-carrier that by their movements the threads which they control are successively introduced into and withdrawn from the thread-carrier, substantially as described.

21. In a circular-knitting machine, the combination of the knitting-cylinders; an annular rotating horizontal plate external to the cylindrical surface defined by the needles mounted above said cylinders and concentrically thereto, and formed with a flange depending from its internal periphery; a thread-carrier formed near the bottom of this flange; a V-shaped thread-guide formed in said flange above the thread-carrier and leading thereto; a plurality of bobbin-carriers mounted on said rotating plate, each fitted with a different thread; and a plurality of vertically-movable thread-carrying levers which successively introduce and withdraw their threads to and from the thread-carrier, substantially as described.

22. In a circular-knitting machine, the combination of the knitting-cylinders; an annular horizontal rotating plate mounted above said cylinders and concentrically thereto, provided with a flange depending from its internal periphery; a thread-carrier formed near the base of this flange; an opening in the surface of the rotating plate connecting with the thread-carrier by a V-shaped expanding slot in the depending flange; a series of thread-changing levers pivoted in parallel relation to each other above the opening in the rotating plate; and in such relation to it that when horizontal, each lever is wholly above the plate with its thread-carrying end over the V-shaped slot, and when that end is depressed it is carried down to below the level of the thread-carrier and in proximity thereto; in combination with means for successively depressing said levers, substantially as described.

23. In a circular-knitting machine, the combination of the knitting-cylinders; an annular horizontal rotating plate mounted above said cylinders and concentrically thereto, provided with a flange depending from its internal periphery; a thread-carrier formed near the base of this flange; an opening in the surface of the rotating plate connecting with the thread-carrier by a V-shaped expanding slot in the depending flange; a series of levers pivoted upon a common horizontal pivot, mounted on the rotating plate on the side of the said opening farthest away from the slot by which it is connected with the thread-carrier; in combination with means for successively raising and lowering said thread-changing levers so as to bring their thread-carrying ends successively above the V-shaped expanding slot or below and to the rear of the thread-carrier, substantially as described.

24. In a circular-knitting machine, the combination of a horizontal annular rotating plate, mounted concentrically over and rotating synchronously with the cam-cylinder; a thread-changing lever pivoted upon the horizontal plate with its thread-carrying end oscillating vertically in relation to the needle-cylinder; and a horizontal bell-crank lever also mounted upon said rotating plate in operative connection with the other end of the thread-changing lever and by which it is raised or depressed, substantially as described.

25. In a circular-knitting machine, the combination of a rotating thread-carrier; a V-shaped thread-guide open at the top leading thereto; a series of levers pivoted in fixed relation to said thread-carrier, having their free ends pierced, and which when raised, withdraw their threads wholly from the thread-carrier and thread-guide, and when depressed place their thread in the thread-carrier, substantially as described.

26. In a circular-knitting machine, a horizontally-pivoted thread-changer, having its free end provided with a thread-opening, with a flat upper surface in proximity to its pivot and a raised surface in front of the pivot; and a horizontal lever oscillating above and in proximity to the pivot which raises or depresses said thread-changer according as it is moved to one or the other side of the pivot, substantially as described.

27. In a circular-knitting machine, the combination of a rotating plate mounted above and concentric with the knitting-cylinders; a thread-carrier carried by said plate; a plurality of vertically-oscillating thread-changing levers, having their free ends pierced with thread-eyes, pivoted to said plate with their threaded ends in proximity to the thread-carrier; and a plurality of horizontally-oscillating levers, the arms of which lead respectively to the pivoted part of the thread-changing levers oscillating over and in close proximity to the pivot, and by their horizontal oscillation effect the raising or depressing of the thread-changers and consequently the successive introduction or withdrawal of threads from the carriers, substantially as described.

28. In a circular-knitting machine, the combination of a rotating plate mounted above and concentric with the knitting-cylinders and carrying: *a*, a thread-carrier; *b*, a plurality of vertically-oscillating thread-changing levers which by their depression introduce their thread into the thread-carrier; *c*, a plurality of horizontally-oscillating levers by the motion of which the thread-changing levers are respectively raised or depressed; in combination with a single vertically-movable cam, which according to its vertical position is brought into contact with one or the other of the horizontal levers as the plate rotates, and which thereby effects the depression of one or the other of the thread-changers, substantially as described.

29. In a circular-knitting machine, the combination of a horizontal rotating annular plate mounted above and concentric with the knitting-cylinders and carrying: *a*, a single thread-carrier; *b*, a plurality of thread-bobbins; *c*, a similar plurality of vertically-oscillating parallel thread-changing levers, the free ends of which are threaded with the threads from said bobbins respectively; and a V-shaped guide leading to the thread-carrier whereby the successive depression of the free ends of said thread-changers successively introduce differing threads into the thread-carrier, substantially as described.

30. In a circular-knitting machine, the combination of a vertically-oscillating thread-changing lever pivoted upon a horizontal pivot in fixed relation to the cam-cylinder; a bell-crank lever pivoted upon a vertical pivot in fixed relation to the thread-changer, one arm of which actuates the thread-changer, while another arm of it projects into the plane of a fixed cam whereby it is actuated, substantially as described.

31. In a circular-knitting machine, the combination of an annular rotating plate external to the cylindrical surface defined by the needles mounted above and concentric with the knitting-cylinders and carrying: a, a single thread-carrier; b, a plurality of thread-bobbins; c, a similar plurality of thread-guides; d, a similar plurality of thread-locks; e, a similar plurality of take-ups; and means whereby one or the other of said threads may be successively introduced into the said thread-carriers, substantially as described.

32. In a circular-knitting machine, an annular plate sustained above and rotating concentrically with the knitting-cylinders; a cam fixed in relation to the rotation of said plate, but capable of assuming different vertical positions; a plurality of horizontal oscillating levers pivoted upon said rotating plate one above another, with arms which the rotation of the plate causes to contact with the fixed cam, the particular lever thus brought into contact depending upon the vertical position of the cam; and a similar plurality of thread-changers operated by said horizontal levers respectively whereby a similar plurality of threads are successively introduced into the needles, substantially as described.

33. In a circular-knitting machine, a plurality of vertically-oscillating thread-changers; a plurality of levers by which the thread-changers are operated; one lever being operatively connected with each thread-changer and the other ends of the levers being in line with each other vertically; in combination with a cam fixed in relation to the rotation of said plate, but capable of assuming different vertical positions, whereby according to the vertical position of the cam any of the thread-changers may be caused to operate at the same definite rotative position of the machine, substantially as described.

34. In a circular-knitting machine, the combination of a plurality of thread-changing levers, any one of which when depressed feeds thread to the needles; a similar plurality of levers, one end of each of which actuates one of the thread-changing levers raising or depressing it, while their other ends move in proximity to a spring-pressed trigger-plate, by which any lever in the position which depresses its corresponding thread-changer is held until the motion of another lever to depress its thread-changer releases the first from contact with the trigger-plate, substantially as described.

35. In a circular-knitting machine, the combination of a plurality of pivoted thread-changing levers, which by their depression introduce their threads into the needles; a similar plurality of vertically-pivoted three-armed levers, each three-armed lever having one arm by which its thread-changing lever is actuated, one arm by which it is itself actuated by contact with a cam-plate, and a third arm by which when it has depressed its thread-changing lever it is caught by a trigger-plate and held from reverse motion until released by the opposite motion of the corresponding arm of another of the levers, substantially as described.

36. In a circular-knitting machine, the combination of a rotating cam-cylinder; thread-changing levers, i, pivoted in fixed relation thereto; short levers, l, in operative connection therewith; spring-pressed trigger-plate, N; thread-severing mechanism; and connections between the thread-severing mechanism and the trigger-plate, N, whereby the motion of the latter occasioned by the movement of one of the levers, l, throws the thread-severing mechanism into operation; and means whereby, having once operated, the thread-severing mechanism is withdrawn from operation, substantially as described.

37. In a circular-knitting machine, the combination of a fixed needle-cylinder; a rotating cam-cylinder; a rotating thread-clamp within the needle-cylinder; rotating thread-changers without the needle-cylinders carrying threads the ends of which are held by the thread-clamp and by their depression carried down and into the range of the needles; rotating take-ups exerting upward tension on the threads before they reach the thread-changers; and rotating thread-locks through which the thread passes before reaching the take-ups, substantially as described.

38. In a circular-knitting machine, the combination of the knitting-cylinders and the following groups of mechanism; a, mechanism whereby a plurality of threads may be successively introduced to or withdrawn from operative position to be fed to the needles; b, mechanism whereby the free end of any thread so fed to the needles is severed in close proximity thereto; and, c, mechanism whereby any thread withdrawn from the needles is also severed in close proximity thereto, substantially as described.

39. In a circular-knitting machine, the combination of the knitting-cylinders; a single thread-carrier; means for placing therein any one of a plurality of threads; a thread-clip by which the free ends of the threads are held in fixed relation to the thread-carrier; said thread-carrier and said thread-clip being on opposite sides of the lines of the needles, whereby any thread placed in the single thread-carrier is drawn taut between the thread-clip and the thread-carrier and thus fed to the needles; in combination with mechanism whereby the thread so drawn taut is severed in immediate proximity with the needles, substantially as described.

40. In a circular-knitting machine, the combination of a stationary needle-cylinder; a rotating cam-cylinder; a plate within the needle-cylinder rotating synchronously with the cam-cylinder and below the top of the plane of the needles; a spring-pressed thread-clip mounted upon said plate beneath which the free ends of a plurality of threads are held; and a plurality of thread-changing levers rotating with the cam-cylinder, whereby one at a time the threads may be drawn taut across the line of the needles and thereby fed into operation, substantially as described.

41. In a circular-knitting machine, the combination of a stationary needle-cylinder; a rotating cam-cylinder; a plate within the needle-cylinder rotating synchronously with the cam-cylinder and below the top of the plane of the needles; a spring-pressed thread-clip mounted upon said plate beneath which the free ends of a plurality of threads are held; a plurality of thread-changing levers rotating with the cam-cylinder, whereby one at a time the threads may be drawn taut across the line of the needles and thereby fed into operation; a thread-severing device; and an upwardly-turned tongue fixed to said plate around which the waste end of the thread which has been introduced into the needles is wound prior to its severance, substantially as described.

42. In a circular-knitting machine, the combination of a fixed needle-cylinder; a plate in the center of the needle-cylinder rotating synchronously with the cam-cylinder and below the plane of the top of the needles; thread-changing devices rotating with the cam-cylinder; a thread-clip fast to the rotating plate by which the ends of the threads are held; and a thread-guide whereby upon the removal of any thread from the knitting operation the part between the thread-changer and the knitting is guided beneath the thread-clips, substantially as described.

43. In a circular-knitting machine, the combination of a fixed needle-cylinder; a plate in the center of the needle-cylinder rotating synchronously with the cam-cylinder and below the plane of the top of the needles; thread-changing devices rotating with the cam-cylinder; a thread-clip fast to the rotating plate by which the ends of the threads are held; a thread-guide whereby upon the removal of any thread from the knitting operation the part between the thread-changer and the knitting is guided beneath the thread-clips; and a thread-severing device whereby as soon as it is thus guided beneath the thread-clips it is severed between the thread-clips and the knitting, substantially as described.

44. In a circular-knitting machine, a thread-severing device consisting of a plate rotating within the circle of the needles; a blunt hammer reciprocating against the plate; and means whereby the end of a thread is guided between the hammer and the plate and severed by pounding, substantially as described.

45. In a circular-knitting machine, a thread-severing device consisting of a flat plate; a blunt-ended hammer; means for guiding a thread to be severed from the knitting between the hammer and the plate and there stretching it taut; and means for delivering a blow of the hammer upon the thread at this point, substantially as described.

46. In a circular-knitting machine, the combination of the knitting-cylinders; a thread-carrier; a horizontal plate sustained within the circle of the needles; means for holding said plate in fixed relation to the thread-carrier; a vertical hammer with a blunt edge above said plate; means for guiding a thread which is to be severed from the knitting into position between the plate and the hammer and there stretching it taut; and means for causing the hammer to deliver a blow upon the thread at that point, substantially as described.

47. In a circular-knitting machine, the combination of a fixed needle-cylinder; a rotating cam-cylinder; a plate in the center of the needle-cylinder rotating synchronously with the cam-cylinder and below the plane of the top of the needles; a thread-changing lever rotating with the cam-cylinder and capable of depressing thread below the plane of the top of the needles; a thread-clip fast to the plate by which the end of the thread is held; a thread-severing device upon said plate; a projecting tongue upon said plate, around which the waste end of a thread which has been introduced into the needles is wound prior to its severance; and an adjustable edge upon said tongue, substantially as described.

48. In a circular-knitting machine, the combination with the needle and cam cylinder of a horizontal plate suspended within the circle of the needles; connections whereby said plate is caused to revolve concentrically and coincidently with the rotation of the cylinder; a thread-severing device upon said plate; and means whereby the waste end of a thread which has been introduced between the needles is caused to be severed by said device, substantially as described.

49. In a circular-knitting machine, the combination of a fixed needle-cylinder; a rotating cam-cylinder; a horizontal plate suspended within the circle of the needles and rotating in fixed relation to the cam-cylinder; a thread-severing device upon said plate; and means whereby both the end of a thread which has been withdrawn from the needles, and the waste end of a thread which has been introduced between the needles, are caused to be simultaneously severed by said device, substantially as described.

50. In a circular-knitting machine, the combination of the needle and cam cylinders; a horizontal plate suspended within the circle of the needles in fixed relation to the cam-cylinder; thread-changing levers mounted in fixed relation to the cam-cylinder outside the circle of the needles; a thread-clamping device, and a thread-severing device mounted on the plate on the side opposite to the thread-changing levers; and means whereby upon the completion of a half-revolution of the machine, after the withdrawal of the thread, the thread-severing device is caused to operate to sever the thread close to the knitting, the free end of which is simultaneously introduced between the thread-clamping device, substantially as described.

51. In a circular-knitting machine, the combination of the needle and cam cylinders; a horizontal plate suspended within the circle of the needles in fixed relation to the cam-cylinders; thread-changing levers mounted in fixed relation to the cam-cylinder outside the circle of the needles; a thread-clamping device and a thread-severing device mounted on the plate on the side opposite to the thread-changing levers; and means whereby the waste end of a thread which has been inserted in the needles is, upon the completion of a half-revolution after its insertion, caused to pass into the severing device close to its connection with the knitting and be thereby severed, substantially as described.

52. In a circular-knitting machine, the combination of the knitting-cylinders; means for carrying and feeding to the needles a plurality of knitting-threads, one at a time; means for effecting the change of said threads according to a predetermined pattern; a thread-severing device consisting of a fixed plate and a reciprocating hammer by which any thread removed from the needles is severed; and means whereby the blow of the hammer upon the plate to sever said thread is caused to occur only once for each change of thread, substantially as described.

53. In a circular-knitting machine, the combination of the knitting-cylinders; thread-changing devices; a thread-severing device located within the cylinders; means for introducing to the thread-severing device both the thread which has been removed from the needles and the waste end of the thread simultaneously introduced to the needles; and means whereby the motion of the severing device to effect the severance of said thread is caused to occur only once for each change of thread, substantially as described.

54. In a circular-knitting machine, a thread-carrier rotating outside the needles; and a horizontal plate suspended within the circle of the needles rotating simultaneously with the thread-carrier, and having mounted thereon a thread-clip for holding the loose ends of a plurality of knitting-threads, and an oscillating fork whereby said loose ends are swept beneath the thread-clip, substantially as described.

55. In a circular-knitting machine, a thread-carrier rotating outside the needles; and a horizontal plate suspended within the circle of the needles rotating simultaneously with the thread-carrier, and having mounted thereon a thread-clip for holding the loose ends of a plurality of knitting-threads, a thread-severing device, and a guiding-tongue whereby the waste end (between the clip and the needles) of a thread introduced into the thread-carrier is by the rotation of the plate wrapped around it and brought into position to be severed by the thread-severing device, substantially as described.

56. In a circular-knitting machine, a thread-carrier rotating outside the needles; and a horizontal plate suspended within the circle of the needles rotating simultaneously with the thread-carrier, and having mounted thereon a thread-clip for holding the loose ends of a plurality of knitting-threads, a thread-severing device, a guiding-tongue whereby the waste end (between the clip and the needles) of a thread introduced into the thread-carrier is by the rotation of the plate wrapped around it and brought into position to be severed by the thread-severing device, and an adjustable edge on the part of the plate which the thread wraps, whereby the thread thus to be severed is held taut within the play of the severing device, substantially as described.

57. In a circular-knitting machine, a thread-carrier rotating outside the needles and a horizontal plate suspended within the circle of the needles rotating simultaneously with the thread-carrier, and having mounted thereon a thread-clip for holding the loose ends of a plurality of knitting-threads, a thread-severing device, and a thread-guiding arm by which the thread withdrawn from the thread-carrier and thus from the knitting is guided first beneath the thread-clip and then to the severing device so as to be severed from the knitting between it and the clip, leaving the free end beneath the clip, substantially as described.

58. In a circular-knitting machine, a thread-carrier rotating outside the needles; and a horizontal plate suspended within the circle of the needles rotating simultaneously with the thread-carrier, and having mounted thereon a thread-clip for holding the loose ends of a plurality of knitting-threads, a thread-severing device, a guiding-tongue whereby the waste end (between the clip and the needles) of a thread introduced into the thread-carrier, is by the rotation of the plate wrapped around it and brought into position to be severed by the thread-severing device, an adjustable edge on the part of the plate which the thread wraps, whereby the thread thus to be severed is held taut within the play of the severing device, and a thread-guiding arm by which the thread withdrawn from the thread-carrier and thus from the knitting is guided first beneath the thread-clip and then to the severing device so as to be severed from the knitting between it and the clip, leaving the free end beneath the clip, substantially as described.

59. In a circular-knitting machine, the combination of the knitting-cylinders; thread-changing mechanism coöperating therewith; a vertical rod reciprocating once for each rotation of the machine; a cam mounted on said rod by which the thread-changing mechanism is operated, the changes of the thread being determined by its vertical position; and a pattern-wheel revolving with its periphery beneath the vertically-reciprocating rod by means of which the vertical extent of each reciprocation is determined, substantially as described.

60. In a knitting-machine provided with a plurality of threads and thread-changing mechanism, the combination of a vertically-reciprocating rod; a cam mounted on said rod and which by its varying vertical position determines the successive actuations of the thread-changing mechanism; a horizontal pattern-wheel with a radially-slotted periphery revolving with its periphery beneath the vertically-reciprocating rod; a series of pattern-jacks fitted in the peripheral slots of said pattern-wheel; and means whereby the said pattern-wheel is advanced one slot for each successive rotation of the machine, said means consisting of a pawling-lever which engages the projecting pattern-jacks, substantially as described.

61. In a knitting-machine provided with a plurality of threads and thread-changing mechanism, the combination of a vertically-reciprocating rod; a cam mounted on said rod and which by its varying vertical position determines the successive actuations of the thread-changing mechanism; a horizontal pattern-wheel with a radially-slotted periphery revolving with its periphery beneath the vertically-reciprocating rod; a series of pattern-jacks fitted in the peripheral slots of said pattern-wheel; and means whereby the said pattern-wheel is advanced one slot for every successive rotation of the machine, said means consisting of a pawling-lever which engages the projecting pattern-jacks, the point of engagement being directly beneath the vertically-reciprocating rod, substantially as described.

62. In a circular-knitting machine provided with a plurality of threads and thread-changing mechanism, the combination of a cam mounted on a vertically-reciprocating rod which by its varying vertical position determines the successive actuation of the thread-changing mechanism; means whereby said rod is given one complete reciprocation for each rotation of the machine; a pattern-wheel carrying a series of pattern-jacks around its periphery by which the descent of the rod at the end of each reciprocation is limited; means whereby said pattern-wheel is advanced one jack for each rotation of the machine, said jacks comprising a series which limit the descent of the rod with its cam to a position which effects no actuation of the thread-changing mechanism; a plurality of series equal to the plurality of threads, each jack of each series limiting the descent of the rod with its cam to a position which throws the corresponding thread into operation; and a series which permit the rod to descend to a position which brings the machine to a stop, substantially as described.

63. In a circular-knitting machine, the combination of the knitting-cylinders; a plurality of threads; thread-changing mechanism; means for effecting the succession of the threads according to a predetermined pattern; connections whereby the moving member of the knitting-cylinders may be caused to either rotate or oscillate, said means comprising: $a$, a belt-shifter; $b$, a pulley with connections which rotate the moving knitting-cylinders; $c$, an idle pulley; $d$, a one-way clutch, whereby the idle pulley may be caused to reciprocate the moving knitting-cylinder; $e$, connections whereby at the end of the predetermined pattern the belt is shifted from the rotary to the idle pulley; $f$, means for limiting the extent of this oscillatory motion set up by the one-way clutch; $g$, means whereby at the end of said oscillatory period the belt is again automatically shifted to the rotary pulley, substantially as described.

64. In a circular-knitting machine, the combination of the knitting-cylinders; a plurality of threads; thread-changing mechanism; means for effecting the succession of the threads according to a predetermined pattern; connections whereby the moving member of the knitting-cylinders may be caused to either rotate or oscillate, said means comprising: $a$, a belt-shifter; $b$, a pulley with connections which rotate the moving knitting-cylinders; $c$, an idle pulley; $d$, a clutch and connections whereby the idle pulley may be caused to reciprocate the moving knitting-cylinder; $e$, connections whereby at the end of the predetermined pattern the belt is shifted from the rotary to the idle pulley; $f$, means for limiting the length of the oscillatory motion set up by movement of the clutch; $g$, a stop by which shifting of the belt back to the rotary pulley is prevented during the entire oscillatory period; $h$, means whereby at the end of said oscillatory period the belt is again automatically shifted to the rotary pulley, substantially as described.

EMIL A. HIRNER.

Witnesses:
JAMES H. BELL,
E. REESE.